United States Patent
Bui et al.

(10) Patent No.: US 7,957,088 B1
(45) Date of Patent: Jun. 7, 2011

(54) TRACK COMPENSATION AND SKEW COMPENSATION FOR DRIVES HAVING FLANGELESS ROLLERS AND SYSTEMS THEREOF

(75) Inventors: Nhan X. Bui, Tucson, AZ (US);
Giovanni Cherubini, Rueschlikon (CH);
Jens Jelitto, Rueschlikon (CH);
Kazuhiro Tsuruta, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/716,200

(22) Filed: Mar. 2, 2010

(51) Int. Cl.
*G11B 5/58* (2006.01)
(52) U.S. Cl. ......................................................... 360/76
(58) Field of Classification Search ........................ None
See application file for complete search history.

(56) References Cited

U.S. PATENT DOCUMENTS

| | | | |
|---|---|---|---|
| 6,430,008 B1 * | 8/2002 | Trabert et al. | 360/317 |
| 6,724,559 B1 * | 4/2004 | Konishi et al. | 360/76 |
| 6,724,561 B1 * | 4/2004 | Wyman | 360/76 |
| 6,937,425 B2 * | 8/2005 | Knowles et al. | 360/76 |
| 7,245,450 B1 | 7/2007 | Cherubini et al. | 360/73.12 |
| 7,342,738 B1 * | 3/2008 | Anderson et al. | 360/77.12 |
| 7,365,929 B2 | 4/2008 | Cherubini et al. | 360/73.12 |
| 7,436,621 B2 * | 10/2008 | Goker et al. | 360/76 |
| 7,538,966 B2 * | 5/2009 | Day | 360/76 |
| 7,764,460 B2 * | 7/2010 | Bates et al. | 360/76 |
| 2007/0171565 A1 | 7/2007 | Cherubini et al. | 360/77.12 |
| 2008/0024904 A1 | 1/2008 | Cherubini et al. | 360/73.04 |
| 2009/0161249 A1 * | 6/2009 | Takayama et al. | 360/77.12 |
| 2009/0316296 A1 * | 12/2009 | Cherubini et al. | 360/76 |
| 2010/0302677 A1 * | 12/2010 | Bates et al. | 360/77.12 |
| 2010/0315740 A1 * | 12/2010 | Bates et al. | 360/77.12 |

FOREIGN PATENT DOCUMENTS

WO 2007/085529 8/2007

OTHER PUBLICATIONS

U.S. Appl. No. 11/969,184 filed, Jan. 3, 2008.
U.S. Appl. No. 12/716,192, filed Mar. 2, 2010.
U.S. Appl. No. 12/487,252, filed Jun. 18, 2009.
U.S. Application entitled "Servo Channel For Tape Drive Systems" Cherubini et al., International Business Machines Corporation, filed Jan. 3, 2008.
Notice of Allowance from U.S. Appl. No. 12/716,192 dated Feb. 4, 2011.

* cited by examiner

*Primary Examiner* — Wayne R Young
*Assistant Examiner* — James L Habermehl
(74) *Attorney, Agent, or Firm* — Zilka-Kotab, PC

(57) ABSTRACT

According to one embodiment, a system includes a plurality of synchronous servo channels, where each channel receives a signal from a servo reader of a magnetic head. The system also includes logic for estimating a tape velocity, logic for determining a first and second time instant representing a time at which a flag is generated by a related servo channel, logic for determining a first and second correction term representing a time difference between a time at which a peak of a correlation signal and a time at which the flag occur, logic for calculating a skew error estimate based on a reference shift value associated with a servo band pair being spanned by a head module, and logic for applying a control signal including a skew correction that corresponds to the calculated skew error estimate to the skew-following loop. Other systems and methods are disclosed as well.

20 Claims, 15 Drawing Sheets

Servo bands 2 and 3

Servo bands 0 and 1

Servo bands 3 and 4

TRACK COMPENSATION AND SKEW COMPENSATION FOR DRIVES HAVING FLANGELESS ROLLERS AND SYSTEMS THEREOF

BACKGROUND

Timing-based servo (TBS) is a technology developed specifically for linear tape drives in the late 1990s. In TBS systems, recorded servo patterns include transitions with two different azimuthal slopes. Head lateral position is derived from the relative timing of pulses generated by a servo reader reading the servo patterns. The complete format for the linear tape-open (LTO) drives of generation 1 (LTO-1), including the geometry of the servo patterns, was standardized by the European Computer Manufacturers Association (ECMA) in 2001 as ECMA-319. Additional information on LTO technology, in particular on LTO drives of generations 2 to 4 (LTO-2 to LTO-4), where the servo format was not modified from LTO-1, can be found on the World Wide Web at http://www.ultrium.com. The servo format remains unchanged also for LTO drives of generation 5 (LTO-5). Furthermore, TBS patterns allow the encoding of additional longitudinal position (LPOS) information without affecting the generation of the transversal position error signal (PES). This is obtained by shifting transitions from their nominal pattern position. Servo patterns comprise servo frames, whereby each servo frame has a length equal to 200 microns and encodes one bit of LPOS information.

In the current linear tape-open (LTO) servo format, the servo patterns are pre-recorded in five bands distributed across the tape. Data is recorded in the four regions located between pairs of servo bands. The positioning of the five servo bands and the four data bands on a tape 300 is specified in the LTO format, as represented in prior art FIG. 3. In read/write head modules 302 of LTO tape drives, two servo readers 304, 306 are normally available per head module, from which LPOS information, as well as PES, can be derived. The identity of each servo band (n), $0 \leq n \leq 4$, is determined by the relative positions down the tape of frames in servo bands n and n+1, reading with the top and bottom servo readers, respectively, where the head module is assumed perpendicular to the tape edge. The four possible relative shifts of the patterns in the servo band n+1 with respect to the patterns in the servo band n when the tape is moving in the forward direction (BOT to EOT) are equal to +/−33 microns and ±/−66 microns in the LTO format.

Optimum detection of the servo patterns is achieved by a synchronous servo channel employing a matched-filter interpolator/correlator, which ensures that filtering of a servo reader signal is performed not only at constant tape velocity, but also during acceleration and deceleration. A synchronous servo channel thus ensures an optimum processing of a servo signal for the generation of lateral position and velocity estimates, which are then employed for the control of track-following and reel-to-reel servomechanisms of the tape drive. The initial parameters that are used for proper servo channel operation, e.g., tape velocity and head lateral position, are estimated from the peak locations of the servo channel signal, using the knowledge of the UFO servo pattern geometry.

In drives using flanged rollers to transport the tape between the reels, the flanges limit the motion of the tape thereby increasing the probability that it is in a correct lateral position, and that the tape-to-head skew is small, but also introduce debris that accumulates on the tape, impacts the lifetime of the tape, and creates undesirable dynamic effects. One solution to this problem is to remove the flanges, as described in A. J. Argumedo, et al., "Scaling tape-recording areal densities to 100 Gb/in$^2$," IBM J. Res. & Dev., Vol. 52. no. 4/5, July/Sept 2008.

By removing the flanges, there is no constraint on the lateral motion of the tape. Consequently, lateral tape motion (LTM) is more pronounced, leading to large tape-to-head skew. Compensation with skew-following actuation is thus used to keep the head perpendicular to the tape edge. For this purpose, a new actuator may be used in the next generation of tape drives that will include a rotational degree of freedom. This further degree of freedom introduces a large uncertainty on the initial value of the tape-to-head skew, which cannot be resolved by reading the servo information unless the servo bands are identified.

Because of the four possible relative shifts between servo bands, however, it is difficult to simultaneously identify the tape-to-head skew and which servo bands are being read by the servo readers on the head module. The need therefore exists for a robust and reliable method for identifying the servo bands spanned by the head module and for determining the tape-to-head skew. This need exists not only in LTO tape systems, but other tape formats which include servo patterns for use in aligning the tape with the head reading and/or writing information from/to the tape.

SUMMARY

In one embodiment, a system includes a plurality of synchronous servo channels, each synchronous servo channel including a servo reader included in a magnetic head. The system also includes logic for estimating a tape velocity ($\hat{v}$), logic for determining a first time instant ($\hat{\tau}_1$) and second time instant ($\hat{\tau}_2$), each time instant representing a time at which a flag is generated by a related servo channel selected from the plurality of synchronous servo channels, logic for determining a first correction term $\Delta_1$ and a second correction term $\Delta_2$, each correction term representing a time difference between a time at which a peak of a correlation signal and a time at which the flag occur on the related servo channel, logic for calculating a skew error estimate ($\Theta_{err}$) based on a reference shift value ($\Theta_{ref}$) associated with a servo band pair being spanned by a head module included in the magnetic head, where $\Theta_{err} = \hat{v}(\hat{\tau}_2 - \hat{\tau}_1 + \Delta_1 - \Delta_2) - \Theta_{ref}$, and logic for applying a first control signal to the skew-following loop, wherein the first control signal includes a skew correction that corresponds to the calculated skew error estimate.

A method, according to another embodiment, includes estimating a tape velocity ($\hat{v}$), determining a first time instant ($\hat{\tau}_1$) and second time instant ($\hat{\tau}_2$), each time instant representing a time at which a flag is generated by a related servo channel selected from a plurality of synchronous servo channels, determining a first correction term $\Delta_1$ and a second correction term $\Delta_2$, each correction term representing a time difference between a time at which a peak of a correlation signal and a time at which the flag occur on the related servo channel, calculating a skew error estimate ($\Theta_{err}$) based on a reference shift value ($\Theta_{ref}$) associated with a servo band pair being spanned by a head module, where $\Theta_{err} = \hat{v}(\hat{\tau}_2 - \hat{\tau}_1 + \Delta_1 - \Delta_2) - \Theta_{ref}$, and applying a first control signal to the skew-following loop, wherein the first control signal includes a skew correction that corresponds to the calculated skew error estimate.

According to another embodiment, a system includes a plurality of synchronous servo channels, each synchronous servo channel including a servo reader included in a magnetic head. The system also includes logic for acquiring an initial parameter for each of the plurality of synchronous servo channels, logic for obtaining a set of synchronization-pattern flags from the plurality of synchronous servo channels, and logic for determining an absolute skew value. If the absolute skew value is more than a predetermined value, a second control signal is applied to a skew-following loop to reduce the absolute skew value to less than the predetermined value. The system further includes logic for estimating a tape velocity ($\hat{v}$), logic for determining a first time instant ($\hat{\tau}_1$) and second time instant ($\hat{\tau}_2$) each time instant representing a time at which a flag is generated by a related servo channel selected from the plurality of synchronous servo channels, logic for determining a first correction term $\Delta_1$ and a second correction term $\Delta_2$, each correction term representing a time difference between a time at which a peak of a correlation signal and a time at which the flag occur on the related servo channel, logic for calculating a skew error estimate ($\Theta_{err}$) based on a reference shift value ($\Theta_{ref}$) associated with a servo band pair being spanned by a head module included in the magnetic head, where $\Theta_{err}=\hat{v}(\hat{\tau}_2-\hat{\tau}_1+\Delta_1-\Delta_2)-\Theta_{ref}$, and logic for applying a first control signal to the skew-following loop, wherein the first control signal includes a skew correction that corresponds to the calculated skew error estimate.

A method, in accordance with one embodiment, includes acquiring an initial parameter for each of the plurality of synchronous servo channels, obtaining a set of synchronization-pattern flags from the plurality of synchronous servo channels, and determining an absolute skew value. If the absolute skew value is more than a predetermined value, a second control signal is applied to a skew-following loop to reduce the absolute skew value to less than the predetermined value. The method further includes estimating a tape velocity ($\hat{v}$) determining a first time instant ($\hat{\tau}_1$) and second time instant ($\hat{\tau}_2$), each time instant representing a time at which a flag is generated by a related servo channel selected from the plurality of synchronous servo channels, determining a first correction term $\Delta_1$ and a second correction term $\Delta_2$, each correction term representing a time difference between a time at which a peak of a correlation signal and a time at which the flag occur on the related servo channel, calculating a skew error estimate ($\Theta_{err}$) based on a reference shift value ($\Theta_{ref}$) associated with a servo band pair being spanned by a head module included in the magnetic head, where $\Theta_{err}=\hat{v}(\hat{\tau}_2-\hat{\tau}_1+\Delta_1-\Delta_2)-\Theta_{ref}$, and applying a first control signal to the skew-following loop, wherein the first control signal includes a skew correction that corresponds to the calculated skew error estimate.

Other aspects and embodiments of the present invention will become apparent from the following detailed description, which, when taken in conjunction with the drawings, illustrate by way of example the principles of the invention.

DETAILED DESCRIPTION

Figure 1:
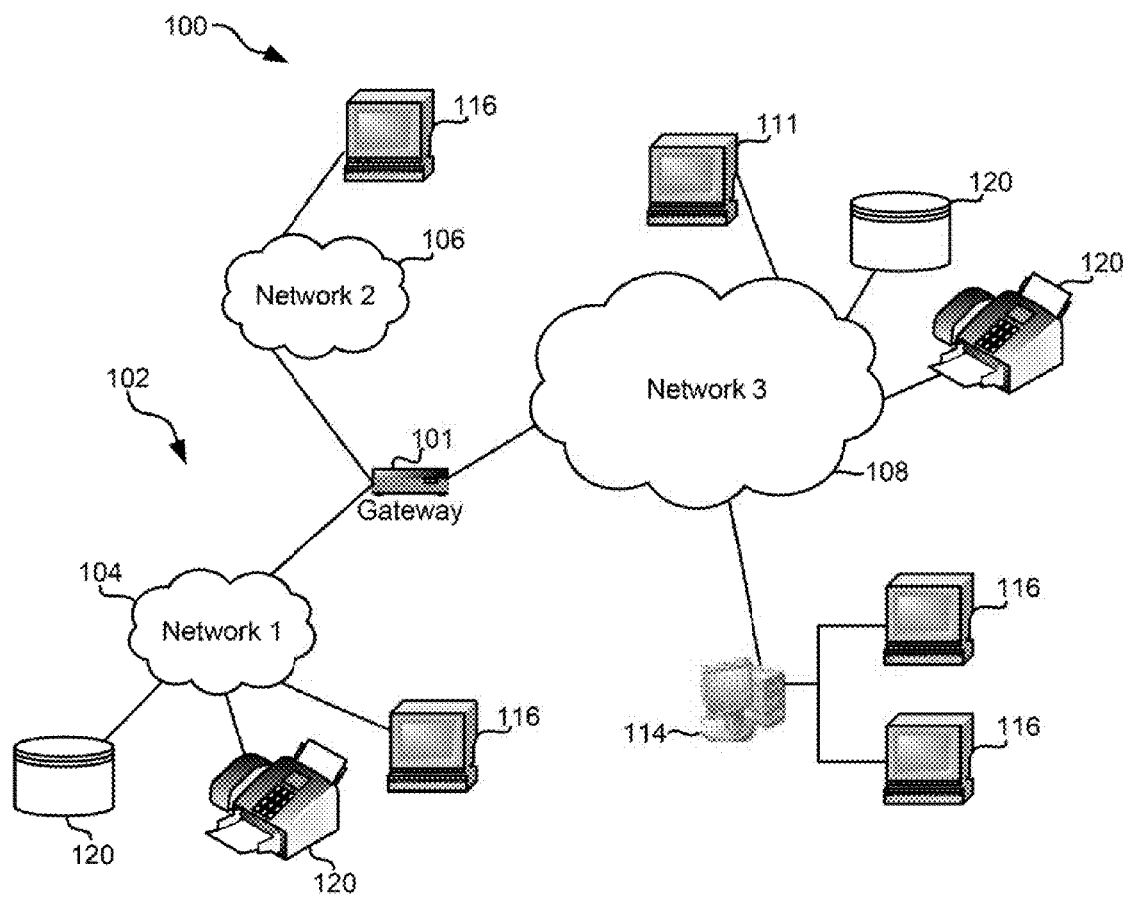
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a system includes a plurality of synchronous servo channels, each synchronous servo channel including a servo reader included in a magnetic head. The system also includes logic for estimating a tape velocity ($\hat{v}$), logic for determining a first time instant ($\hat{\tau}_1$) and second time instant ($\hat{\tau}_2$), each time instant representing a time at which a flag is generated by a related servo channel selected from the plurality of synchronous servo channels, logic for determining a first correction term $\Delta_1$ and a second correction term $\Delta_2$, each correction term representing a time difference between a time at winch a peak of a correlation signal and a time at which the flag occur on the related servo channel, logic for calculating a skew error estimate ($\Theta_{err}$) based on a reference shift value ($\Theta_{ref}$) associated with a servo band pair being spanned by a head module included in the magnetic head, where $\Theta_{err}=\hat{v}(\hat{\tau}_2-\hat{\tau}_1+\Delta_1-\Delta_2)-\Theta_{ref}$ and logic for applying a first control signal to the skew-following loop, wherein the first control signal includes a skew correction that corresponds to the calculated skew error estimate.

In another general embodiment, a method includes estimating a tape velocity ($\hat{v}$), determining a first time instant ($\hat{\tau}_1$) and second time instant ($\hat{\tau}_2$), each time instant representing a time at which a flag is generated by a related servo channel selected from a plurality of synchronous servo channels, determining a first correction term $\Delta_1$ and a second correction term $\Delta_2$, each correction term representing a time difference between a time at which a peak of a correlation signal and a time at which the flag occur on the related servo channel, calculating a skew error estimate ($\Theta_{err}$) based on a reference shift value ($\Theta_{ref}$) associated with a servo band pair being spanned by a head module, where $\hat{\Theta}_{err}=\hat{v}(\hat{\tau}_2-\hat{\tau}_1+\Delta_1-\Delta_2)-\Theta_{ref}$ and applying a first control signal to the skew-following loop, wherein the first control signal includes a skew correction that corresponds to the calculated skew error estimate.

According to another general embodiment, a system includes a plurality of synchronous servo channels, each synchronous servo channel including a servo reader included in a magnetic head. The system also includes logic for acquiring an initial parameter for each of the plurality of synchronous servo channels, logic for obtaining a set of synchronization-pattern flags from the plurality of synchronous servo channels, and logic for determining an absolute skew value. If the absolute skew value is more than a predetermined value, a second control signal is applied to a skew-following loop to reduce the absolute skew value to less than the predetermined value. The system further includes logic for estimating a tape velocity ($\hat{v}$), logic for determining a first time instant ($\hat{\tau}_1$) and second time instant ($\hat{\tau}_2$), each time instant representing a time at which a flag is generated by a related servo channel selected from the plurality of synchronous servo channels, logic for determining a first correction term $\Delta_1$ and a second correction term $\Delta_2$, each correction term representing a time difference between a time at which a peak of a correlation signal and a time at which the flag occur on the related servo channel, logic for calculating a skew error estimate ($\Theta_{err}$) based on a reference shift value ($\Theta_{ref}$) associated with a servo band pair being spanned by a head module included in the magnetic head, where $\Theta_{err}=\hat{v}(\hat{\tau}_2-\hat{\tau}_1+\Delta_1-\Delta_2)-\Theta_{ref}$ and logic for applying a first control signal to the skew-following loop, wherein the first control signal includes a skew correction that corresponds to the calculated skew error estimate.

In yet another general embodiment, a method includes acquiring an initial parameter for each of the plurality of synchronous servo channels, obtaining a set of synchronization-pattern flags from the plurality of synchronous servo channels, and determining an absolute skew value. If the absolute skew value is more than a predetermined value, a second control signal is applied to a skew-following loop to reduce the absolute skew value to less than the predetermined value. The method further includes estimating a tape velocity ($\hat{v}$), determining a first time instant ($\hat{\tau}_1$) and second time instant ($\hat{\tau}_2$), each time instant representing a time at which a flag is generated by a related servo channel selected from the plurality of synchronous servo channels, determining a first correction term $\Delta_1$ and a second correction term $\Delta_2$, each correction term representing a time difference between a time at which a peak of a correlation signal and a time at which the flag occur on the related servo channel, calculating a skew error estimate ($\Theta_{err}$) based on a reference shift value ($\Theta_{ref}$) associated with a servo band pair being spanned by a head module included in the magnetic head, where $\Theta_{err}=\hat{v}(\hat{\tau}_2-\hat{\tau}_1+\Delta_1-\Delta_2)-\Theta_{ref}$ and applying a first control signal to the skew-following loop, wherein the first control signal includes a skew correction that corresponds to the calculated skew error estimate.

As will he appreciated by one skilled in the art, the present invention may be embodied as a system, method, or computer program product. Accordingly, the present invention may take the form of an entirely hardware embodiment, a software embodiment (including firmware, resident software, microcode, etc.) operating an apparatus or an embodiment combining software and hardware aspects that may all generally be referred to herein as a "circuit," "module" or "system." Furthermore, the present invention may take the form of a computer program product stored in any tangible medium of expression having computer-usable program code stored in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, or device. More specific examples (a non-exhaustive list) of the computer-readable medium would include the following: a portable computer diskette, as hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

Figure 2:
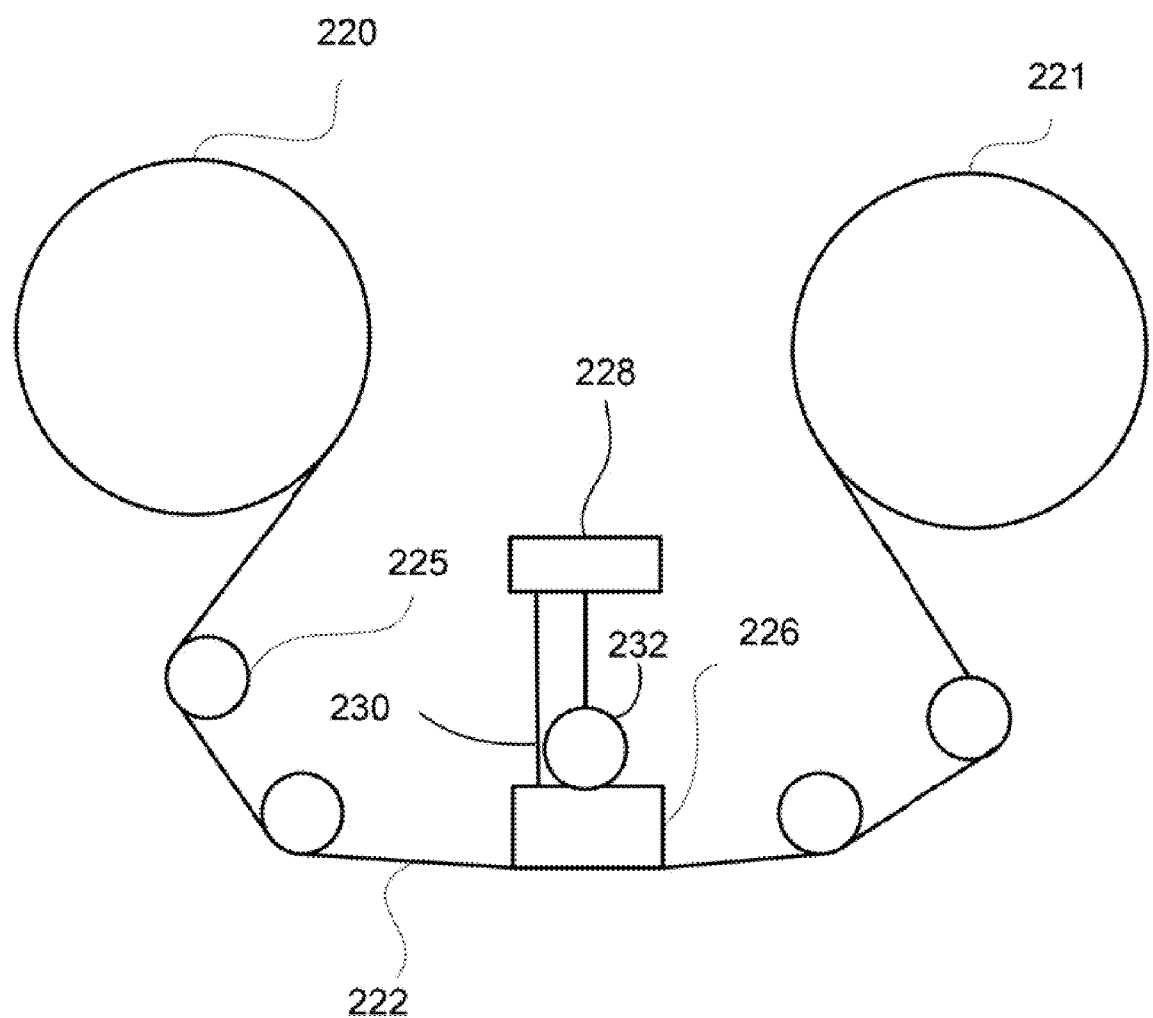
FIG. 2 is a schematic of tape drive system, in accordance with one embodiment.
Figure 3:
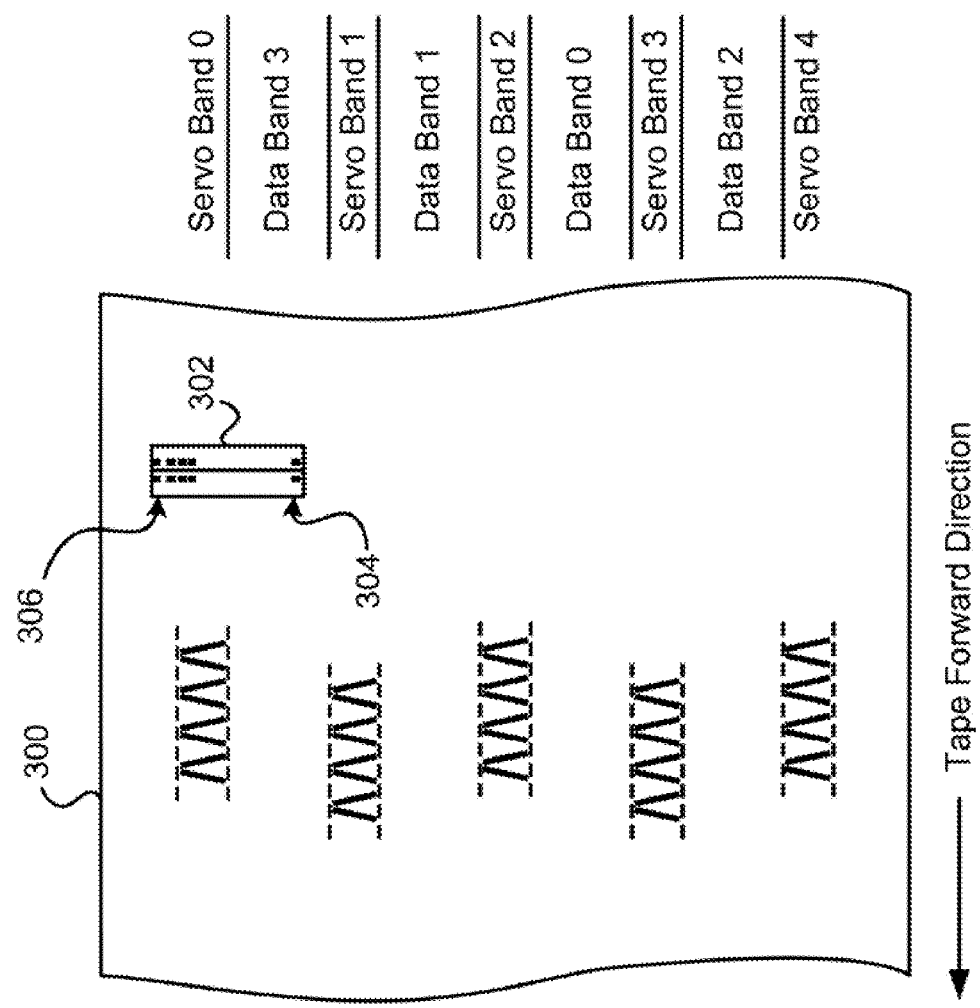
FIG. 3 depicts an LTO tape layout according to the prior art.

FIG. 2 is a schematic diagram of a simplified tape drive system, in accordance with one embodiment, which may be a standalone unit, part of a tape library system, a peripheral 120 of FIG. 1, etc. Such a tape drive may be employed in the context of an embodiment of the present invention. While one specific implementation of a tape drive is shown in FIG. 2, it should be noted that the embodiments of the previous figures may be implemented in the context of any type of tape drive system.

As shown, a tape supply cartridge 220 and a take-up reel 221 are provided to support a tape 222. These may thrift part of a removable cassette and are not necessarily part of the system. Guides 225 guide the tape 222 across a preferably bidirectional tape head 226, of the type disclosed herein. Such tape head 226 is in turn coupled to a controller assembly 228 via an MR connector cable 230. The controller 228, in turn, controls head functions such as servo following, write bursts, read functions, etc. An actuator 232 controls position of the head 226 relative to the tape 222.

A tape drive, such as that illustrated in FIG. 2, includes drive motor(s) to drive the tape supply cartridge 220 and the take-up reel 221 to move the tape 222 linearly over the head 226. The tape drive also includes a read/write channel to transmit data to the head 226 to be recorded on the tape 222 and to receive data read by the head 226 from the tape 222. An interface is also provided for communication between the tape drive and a host (integral or external) to send and receive the data and for controlling the operation of the tape drive and communicating the status of the tape drive to the host, all as will be understood by those of skill in the art.

According to one embodiment, a method for servo band identification and initial convergence of the skew-following loop in tape drives using two servo readers operating on an adjacent pair of servo bands, assuming no a priori knowledge about the position of the head module is disclosed. The LPOS sync-pattern detection flags which are generated by the two servo channels used in LTO tape systems are assumed to be available in other tape systems, and are used to estimate the initial skew and to bring the initial skew error signal for the skew-following loop to within about +/−100 microns. In one embodiment, this is performed with the assumption that in the LTO format, the sequence of LPOS symbols is the same in each servo band. By computing the average difference of the lateral-position estimates from the two servo channels for each of the four possible shifts of the servo patterns (−66 microns, −33 microns, +33 microns, +66 microns), and observing that the maximum difference corresponds to the correct hypothesis, the identification of the servo bands and proper operation of the skew-following loop may be reliably achieved.

In addition, the computation of the skew error signal can be achieved, according to sonic approaches, by using the timing information that is provided by the peaks of the correlation signals generated by the synchronous servo channels. The method based on the correlation signals is not limited to LTO drives but can be applied to other tape drives, such as IBM Enterprise® (Jaguar) drives, and may lead to significantly reduced jitter affecting the skew error, as compared to approaches that are currently used.

Figure 4:
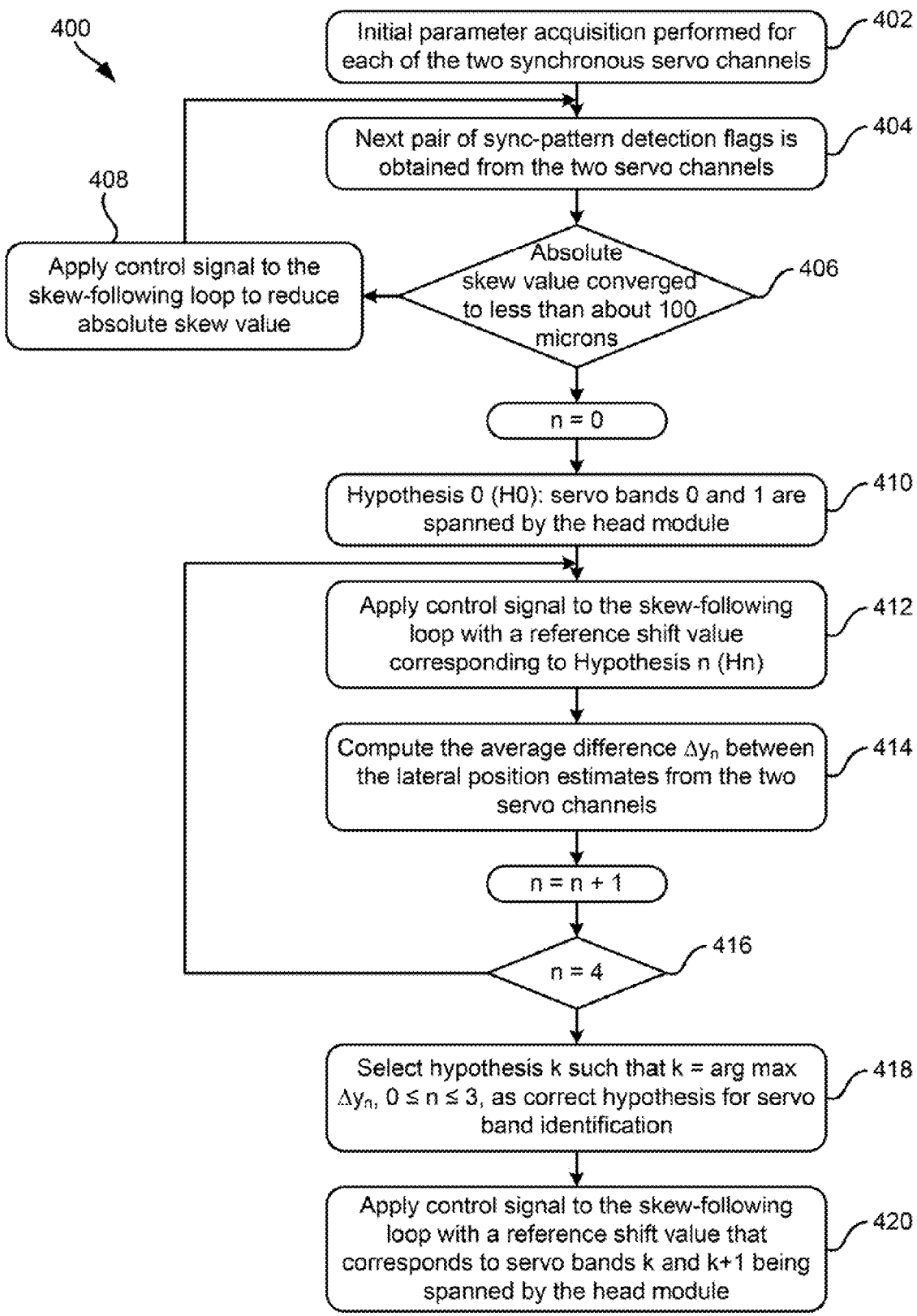
FIG. 4 shows a flow chart of a method according to one embodiment.

According to another embodiment, and with reference to the flowchart shown in FIG. 4, another method 499 may he described. The method may be carried out in any desired environment, and may include steps not shown in FIG. 4 or discussed herein which one of skill in the art would understand to use with the disclosed method 400. Method 400 may preferably be executed in an LTO-based system.

Figure 5:
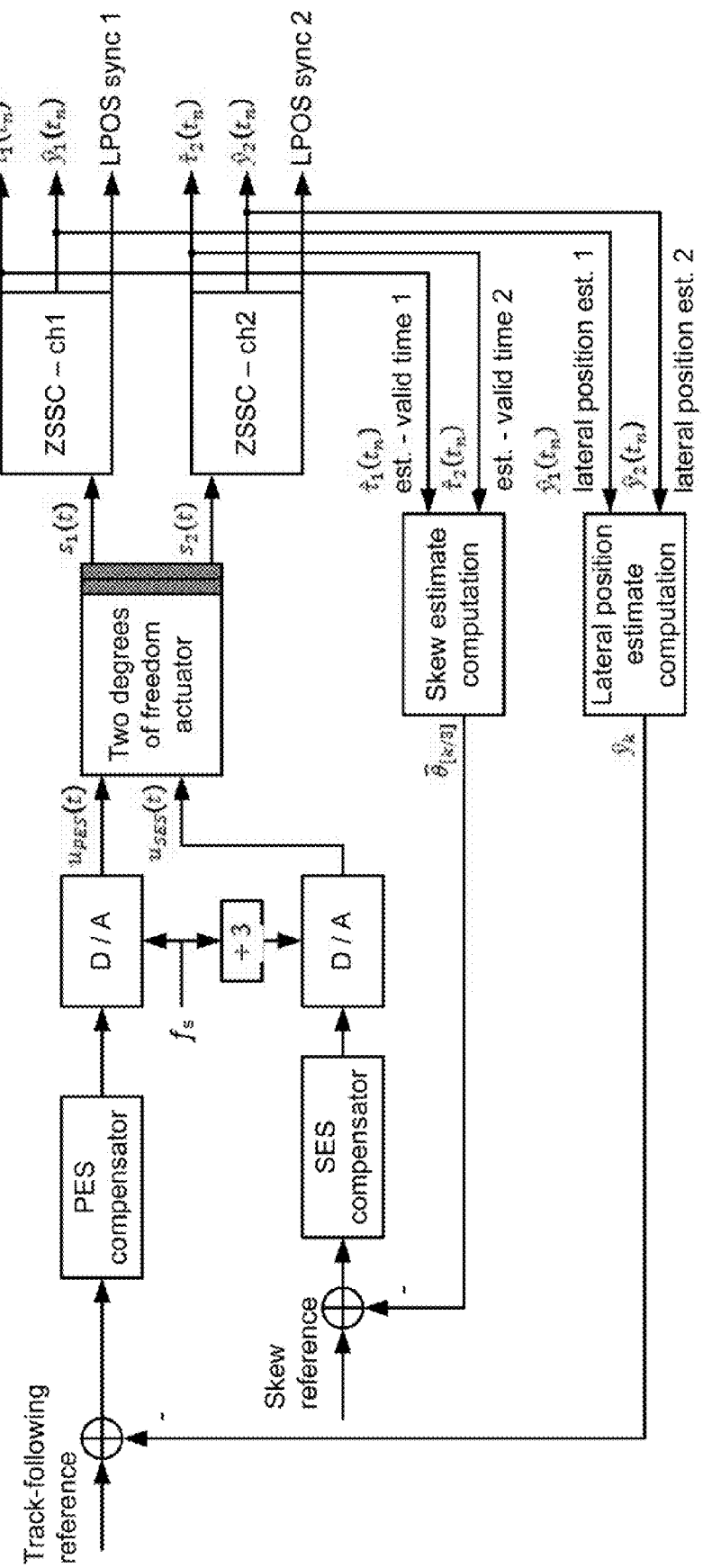
FIG. 5 depicts track-following and skew-compensation loops using dual synchronous servo channels, according to one embodiment.

Initial parameter acquisition is performed for each of the two synchronous servo channels (ZSSCs) processing the servo reader signals. See operation 402. In particular, each servo channel provides a reliable sequence of LPOS symbols and lateral-position estimates. (Note that the same LPOS symbol sequence is encoded in each servo band). Therefore each servo channel outputs an LPOS sync-pattern detection flag upon detecting the 8-bit sync pattern that is part of every 36-bit LPOS word. See operation 404. The time difference between the first pair of sync-pattern detection flags corresponding to the same 36-bit LPOS word, which are output by the servo channels, provides information about the initial value of the tape-to-head skew. As no a priori knowledge about the position of the head module is assumed or needed, there is an uncertainty about which of the four possible shifts between servo patterns on adjacent servo bands (±33 microns, ±66 microns) is actually present in the servo patterns being read by the servo readers. However, the timing information obtained from the sync-pattern detection flags is sufficient to determine a control signal for the skew-following loop that brings the tape-to-head skew to within a predetermined value, such as about 100 microns or less, about 75 microns, about 50 microns, about 150 microns, etc. See operations 406 and 408. A block diagram of the track-following and skew-following loops using dual synchronous servo channels is illustrated in FIG. 5, according to one embodiment. Referring again to FIG. 4, after initial convergence of the tape-to-head skew, a first hypothesis (Hypothesis 0) is applied to the servo bands being spanned by the head module, or, equivalently, on the value of the shift between the servo patterns. See operation 410. The time delay between the generation of lateral-position estimates and LPOS symbols from the corresponding servo frames by the two servo channels is then forced to be equal to the delay that would originate from servo patterns that are separated by a shift given by Hypothesis 0, in one approach. This is achieved by applying a control signal to the skew-following loop with a reference shift value corresponding to Hypothesis 0. See operation 412. After convergence to the reference shift value, the average difference $<\Delta y_0>$ between the lateral position estimates from the two servo channels is computed. See operation 414. After computing $<\Delta y_0>$ a counter is incremented and the next hypothesis, Hypothesis 1, corresponding to a different shift between servo patterns, is tested by computing the new difference $<\Delta y_1>$. The iterations continue until all four hypotheses (Hypothesis 0, Hypothesis 1, Hypothesis 2, Hypothesis 3) corresponding to the possible shifts between servo patterns (±33 microns, ±66 microns) have been tested. See operation 416. In general, the metric given by the difference $\Delta y_n$ is expressed as shown in Equation 1, $$\Delta y_n = y_{top}^{(n)} - y_{bottom}^{(n)} \qquad \text{Equation 1}$$

where $y_{top}^{(n)}$ and $y_{bottom}^{(n)}$ denote the lateral position estimates from the top and bottom servo channels, respectively, which are obtained while testing Hypothesis n.

Figure 6A:
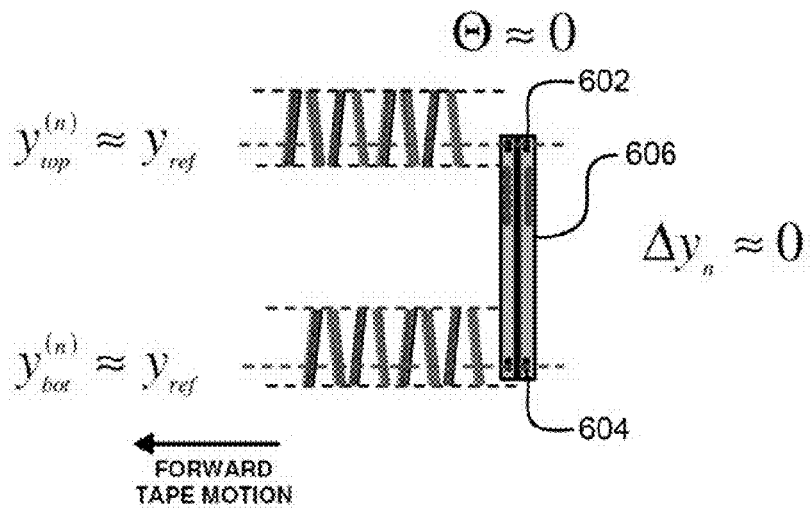
FIG. 6A shows a difference of lateral position estimates of about zero, according to one embodiment.
Figure 6B:
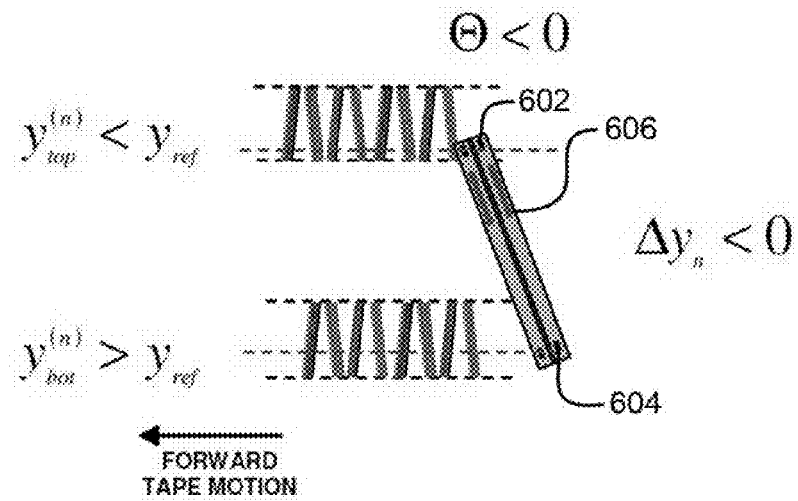
FIG. 6B shows a difference of lateral position estimates of less than zero with accompanying tape-to-head skew, according to one embodiment.
Figure 6C:
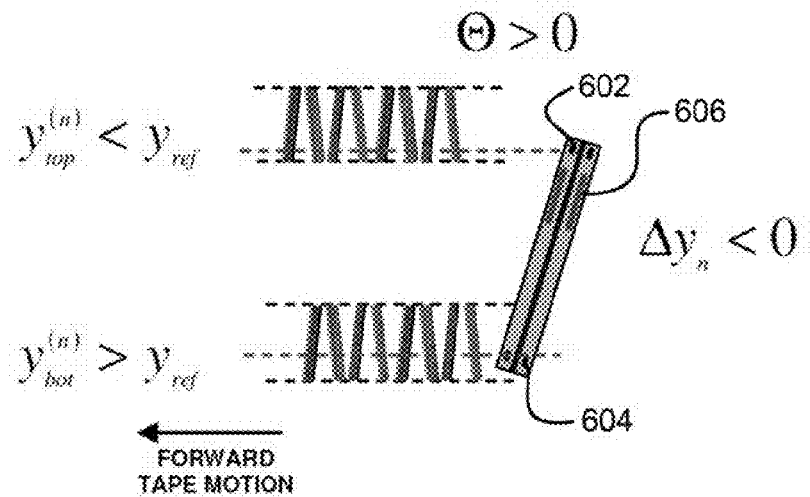
FIG. 6C shows a difference of lateral position estimates of less than zero with accompanying tape-to-head skew, according to one embodiment.

If Hypothesis n, $0 \leq n \leq 3$, is correct, the tape-to-head skew converges to about zero, and the head module is perpendicular to the tape edge. In FIGS. 6A-6C, a situation where the tape 608 does not pass perpendicularly to the had 606, tape-to-head skew may result. Note that in the absence of head tolerances and tape dimensional stability effects due to, e.g., tension variation, in case Hypothesis n is correct, the lateral positions of the two servo readers with respect to the servo patterns are both very close to the desired lateral position, given by $y_{ref}$. Consequently the difference $\Delta y_n$ of lateral position estimates from the two servo channels will be close to zero, as illustrated in FIG. 6A. If Hypothesis n is not correct, the tape-to-head skew converges to a nonzero value, and the lateral positions of the two servo readers with respect to the servo patterns are different. Hence the difference $\Delta y_n$ will be close to a nonzero value, which depends on the tape-to-head skew. In particular, for a nonzero tape-to-head skew, a track-following servo using the combined lateral position estimates from the two servo channels will converge to a position that is smaller than the reference on the Top Channel 602, and larger than the reference on the Bottom Channel 604. Therefore the average difference $<\Delta y_n>$ between the lateral position estimates on the Top Channel 602 and Bottom Channel 604 will yield a negative value, as illustrated in FIGS. 6B and 6C.

The above observations suggest a robust and reliable method for determining which of the four possible shifts between servo patterns is the one corresponding to the servo band pair actually spanned by the head module by dwelling on each of the four possible shifts corresponding to the range of uncertainty of the tape-to-head skew, and for each shift, computing an average value of the difference between lateral position estimates obtained from the servo channels. Next, the servo bands can be identified and the skew-following loop can be locked on the servo band pair corresponding to the shift that yields the maximum value of the average difference of the lateral-position estimates. See FIG. 4, operations 418 and 420.

Figure 7:
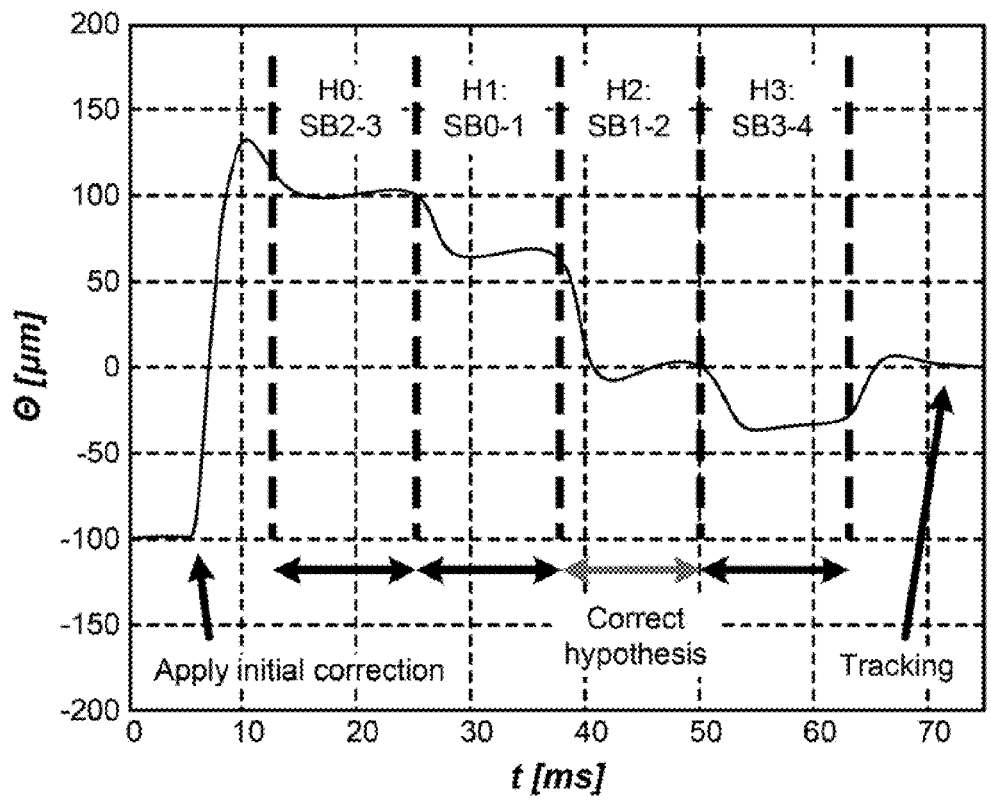
FIG. 7 depicts the tape-to-head skew for the had module spanning servo bands 1 and 2 (1/2), according to one embodiment.
Figure 8:
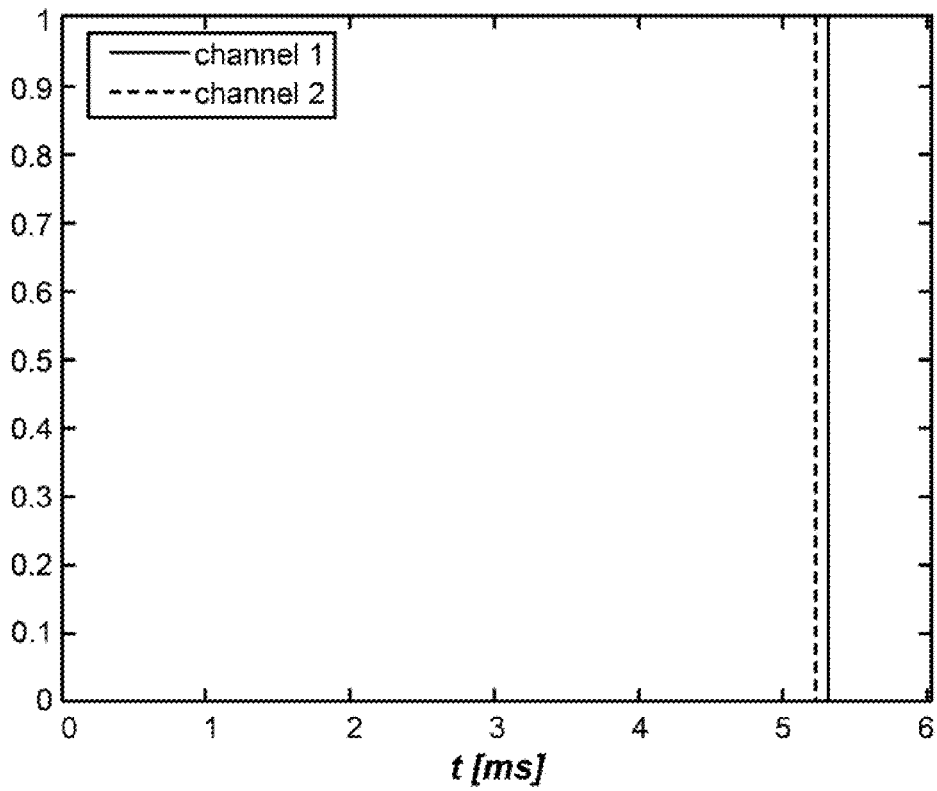
FIG. 8 shows sync-pattern detection flags, according to one embodiment.

To further develop the method, simulations were performed to approximate real world applications. In the following, simulation results are shown for an LTO-5 drive with a tape moving at a velocity of about 1.6 m/s in the forward direction, and track-following and skew-following loops in asynchronous mode of operation with sampling intervals of about 50 μs and 150 μs, respectively. FIG. 7 shows the tape-to-head skew during the initial convergence of the skew and the four steps of hypothesis testing. The head module spans servo bands 1 and 2, so that the shift between servo patterns is equal to −33 microns. The value of the shift is negative as the servo frames on the bottom servo band 2 are read earlier with respect to the corresponding servo frames on the top servo band 1. The first pair of sync-pattern detection flags is obtained from the two servo channels at around t=5 ms, as illustrated in FIG. 8. The sync flag is generated on channel 2 at about 83 μs earlier than on channel 1. As the sum of the shift due to the initial tape-to-head skew and the shift of the servo patterns is equal to −83 [μs]*1.6 [m/s] ≈−133 [μm], this indicates that the initial tape-to-head skew is of about −100 μm (microns).

Clearly, at this point in time, the only information available to the drive is the total shift of −133 microns, larger than 100 microns in absolute value, so a control signal is applied to the skew-following loop to bring the absolute value of the tape-to-head skew to within about 100 microns. A reference shift value of +66 microns is also applied to the skew-following loop as Hypothesis 0 (H0). This corresponds to the hypothesis of servo bands 2/3 being spanned by the head module. Note that the tape-to-head skew now converges to the value of +100 microns, equal to the difference between the reference shift and the servo-pattern shift. The reference shift of +66 microns is applied until t=25 ms, which gives ample time for loop convergence and averaging of the difference between lateral position estimates. In some approaches, the reference shift may be applied for 10 ms, 15 ms, 20 ms, 30 ms, etc., in order to achieve loop convergence and to calculate the average of the difference between lateral position estimates. The reference shift is then varied periodically every 12.5 µs, first to +33 microns, then to −33 microns, and finally to −66 microns, to test the next three hypotheses of servo bands 0/1, 1/2, and 3/4, respectively. The final decision does not depend on the sequence of hypotheses, which can be chosen arbitrarily. (Note that Hypothesis 2 (H2) or servo bands 1/2 being spanned by the head module, which is the correct hypothesis, yields convergence of the skew-following loop to zero). After selecting the hypothesis with the largest metric value as the correct hypothesis, the skew-following loop is locked on those servo bands indicated by the selected hypothesis, as also illustrated in FIG. 9.

Figure 9:
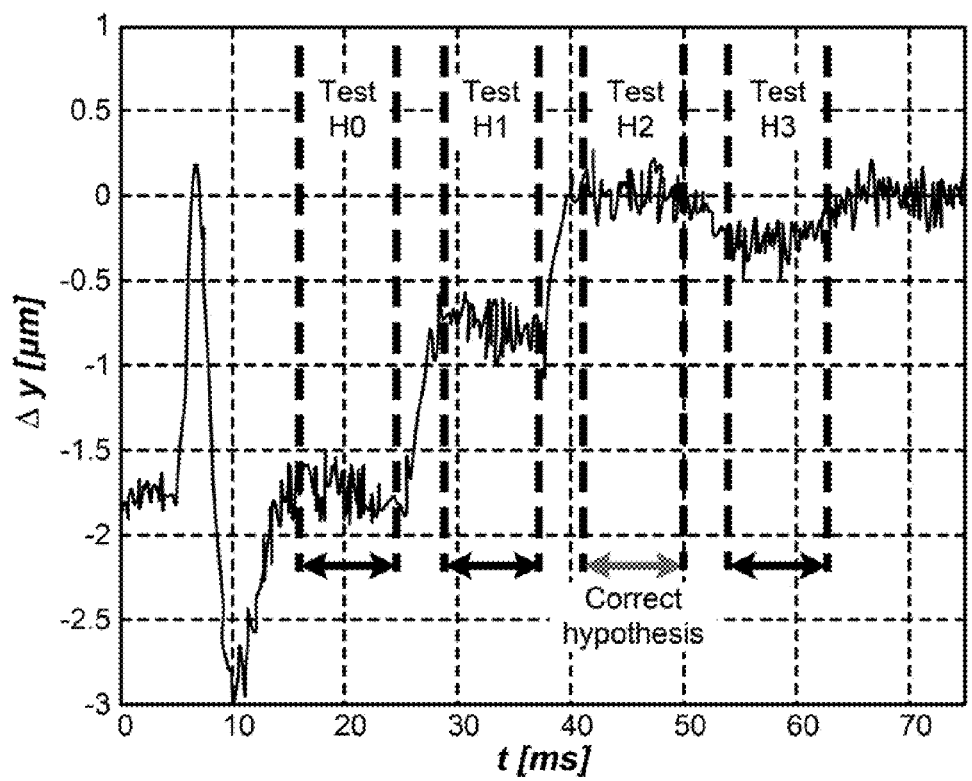
FIG. 9 shows the difference of the lateral position estimates for the head module spanning servo bands 1/2 and intervals for hypothesis testing, according to one embodiment.
Figure 10:
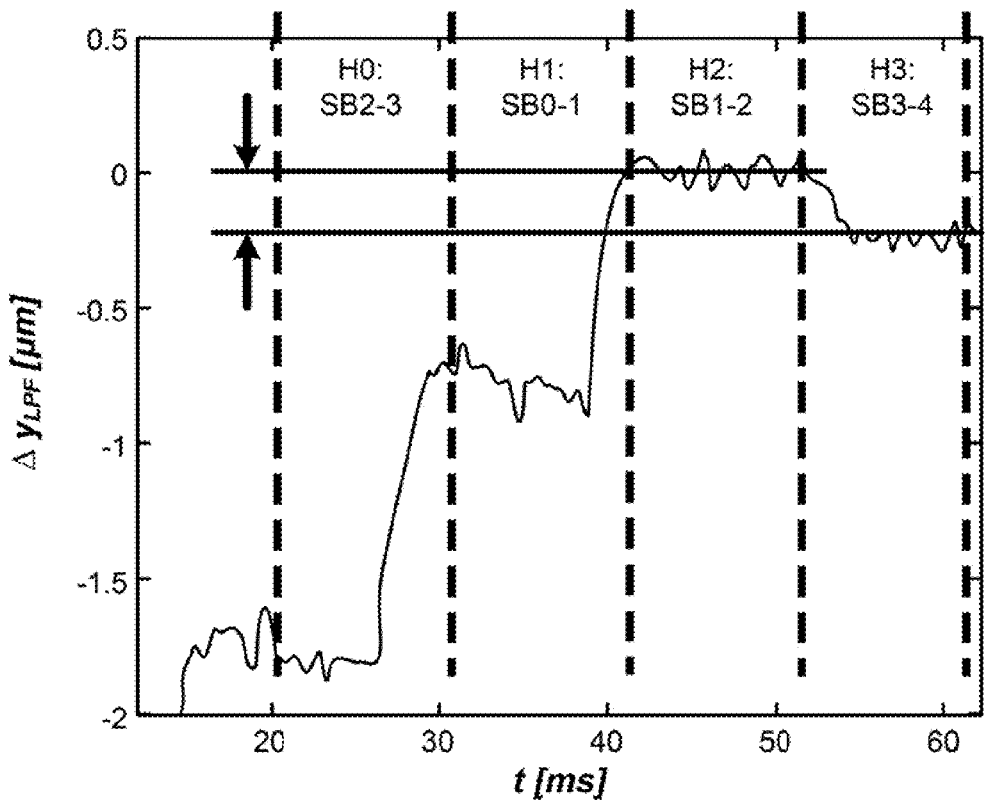
FIG. 10 depicts a metric for hypothesis testing for the head module spanning servo bands 1/2, according to one embodiment.
Figure 11:
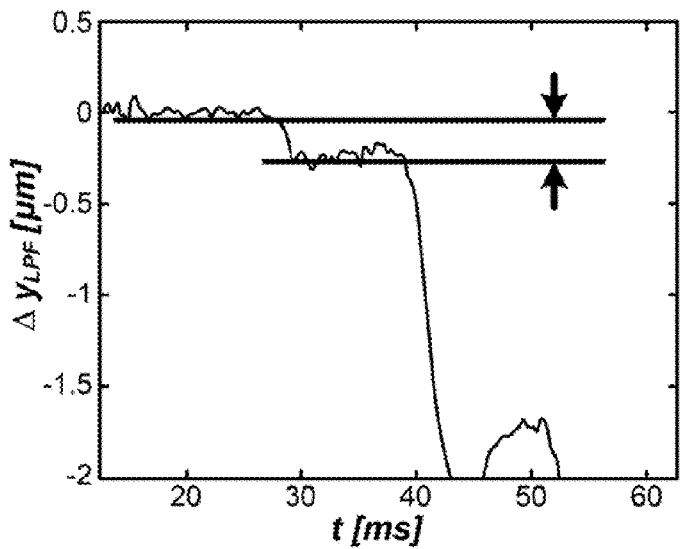
FIG. 11 depicts a metric for hypothesis testing for the head module spanning servo bands 2/3 according to one embodiment.
Figure 12:
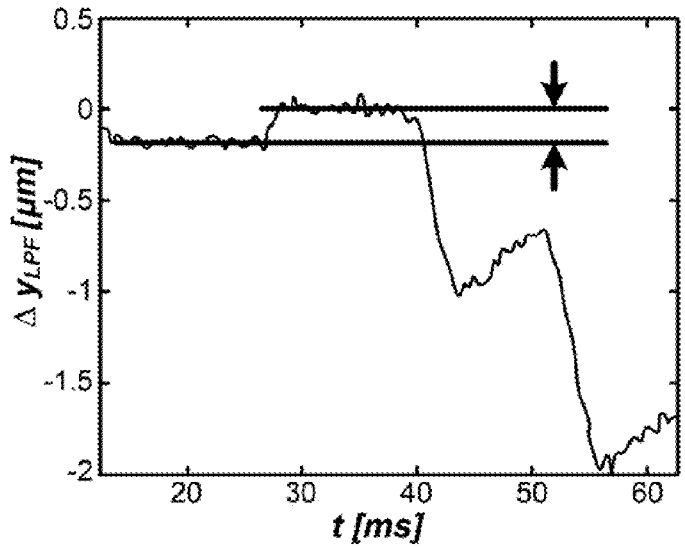
FIG. 12 depicts a metric for hypothesis testing for the head module spanning servo bands 0/1, according to one embodiment.
Figure 13:
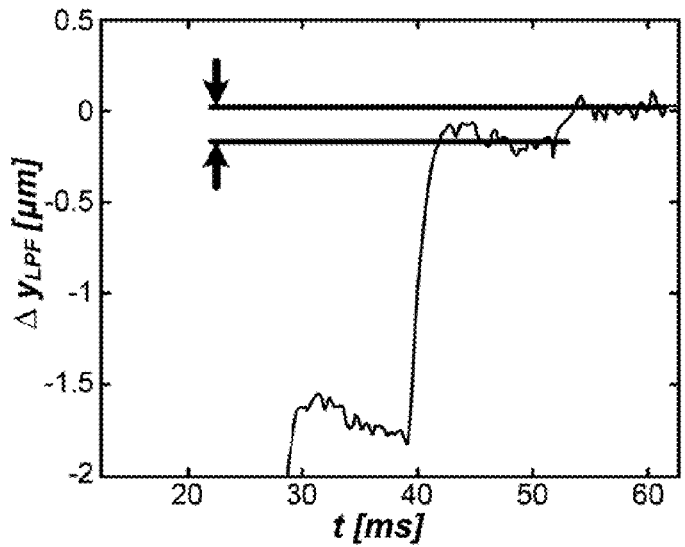
FIG. 13 depicts a metric for hypothesis testing for the head module spanning servo bands 3/4, according to one embodiment.

The difference of the lateral-position estimates that corresponds to the tape-to-head skew of FIG. 7 is illustrated in FIG. 9. Note that the difference $\Delta y_n$ converges to zero for Hypothesis 2 (H2), as the tape-to-head skew also converges to zero. The closest value of $\Delta y_n$ to zero that results from an incorrect hypothesis is obtained for a shift of ±33 microns from the correct hypothesis, e.g., Hypothesis 3 (H3) in FIG. 9. In this case, the nominal value of $\Delta y_n$ is given by the difference of the deviations of the lateral positions with respect to the reference lateral position. Recalling that the nominal distance between servo readers is equal to 2859 microns, the nominal value of $\Delta y_n$ for a shift of ±33 microns is given by $\Delta_{min}=2859-33*\tan(\arccos(33/2859))=190.5$ nm. Convergence of $\Delta y_n$ to the nominal value is obtained only in the ideal case, with an absence of tape dimensional stability effects. In practice, $\langle \Delta y_n \rangle$ may exhibit a large offset, which affects all values obtained for the various hypotheses, and therefore does not affect the methods described herein when searching for a maximum $\Delta y_n$. In particular, the value of the minimum distance $\Delta_{min}$ from the maximum $\Delta y_n$ does not vary significantly in the presence of tape dimensional stability effects. Therefore, the reliability of the methods disclosed herein, according to several embodiments, are not affected, provided the maximum of $\langle \Delta y_n \rangle$ determines the servo band identification and not its absolute value. The variance of the metric determined by $\langle \Delta y_n \rangle$ can be reduced by resorting to low-pass filtering of the difference $\Delta y_n$, as shown in FIG. 10. Averaging of $\Delta y_n$ is then performed by considering the low-pass filtered signal over an interval of approximately 9.5 ms. The distance between $\langle \Delta y_2 \rangle$ and $\langle \Delta y_3 \rangle$ is 219 nm, as also indicated in FIG. 10, whereas the standard deviation of the metric is 6 nm. The metric values for hypothesis testing that were obtained for the cases of the head module spanning servo bands 2/3, 0/1, and 3/4 are shown in FIGS. 11, 12, and 13, respectively. The results are summarized in Table 1, where the minimum distances and the standard deviations are given for each of the four considered cases.

TABLE 1

| Servo Bands Spanned | Minimum Distance [nm] | Standard Deviation [nm] |
|---|---|---|
| 1/2 | 219 | 6 |
| 2/3 | 227 | 5 |
| 0/1 | 191 | 3 |
| 3/4 | 187 | 8 |

Figure 14:
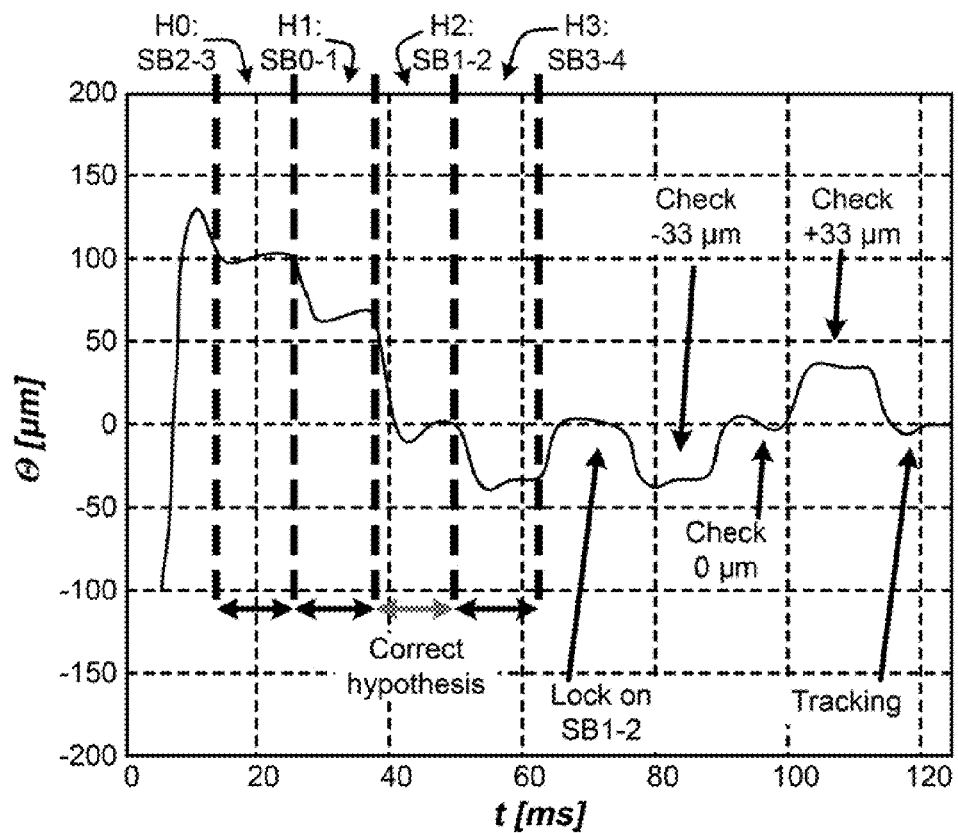
FIG. 14 depicts tape-to-head skew trajectory for the head module spanning servo bands 1/2, including the validation procedure, according to one embodiment.
Figure 15:
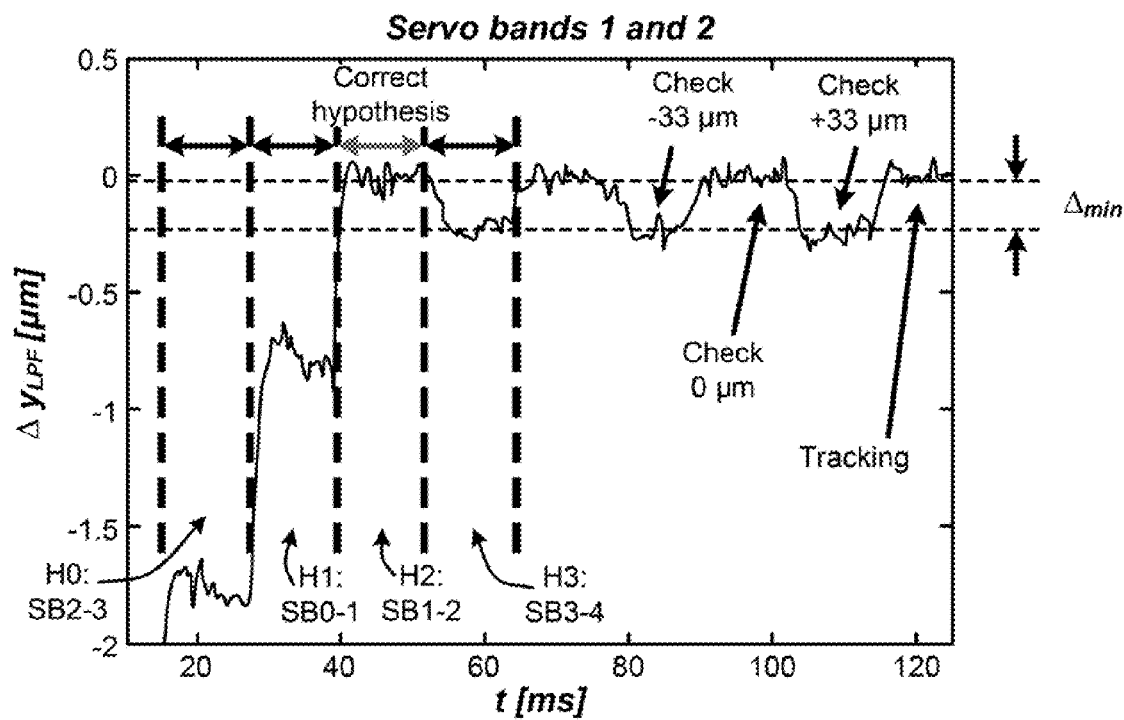
FIG. 15 depicts a metric for hypothesis testing for the head module spanning servo bands 1/2, including the validation procedure, according to one embodiment.

To further improve the reliability of the disclosed method, a preferred embodiment including a validation procedure is now described. After locking the skew-following loop on those servo bands indicated by the selected hypothesis, the reference is periodically varied by +33 microns, as illustrated in FIG. 14. The difference $\Delta y_n$ is then observed over the periods for which the reference is varied, as shown in FIG. 15. If during these periods the value of $\Delta y_n$ remains smaller than the value of $\Delta y_n$ that is found for the reference skew corresponding to the selected hypothesis, the identification of the servo bands is validated and a tracking mode is entered. Another advantage of using the methods described herein is the computation of the skew error signal by using the timing information that is provided by the peaks of the correlation signals generated by the synchronous servo channels, in some approaches.

Figure 16:
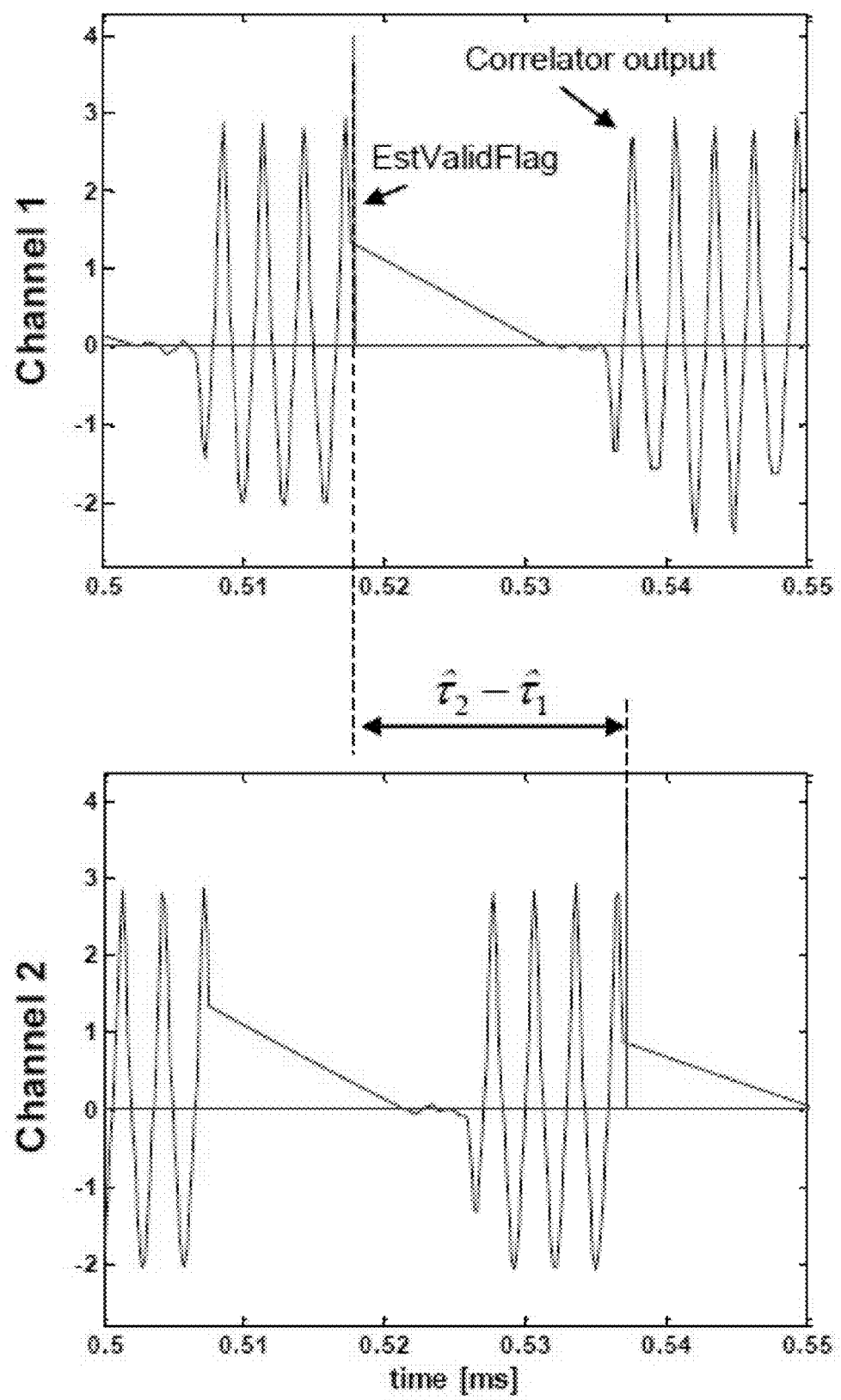
FIG. 16 depicts the skew estimation by estimate-valid flags, according to one embodiment.
Figure 17:
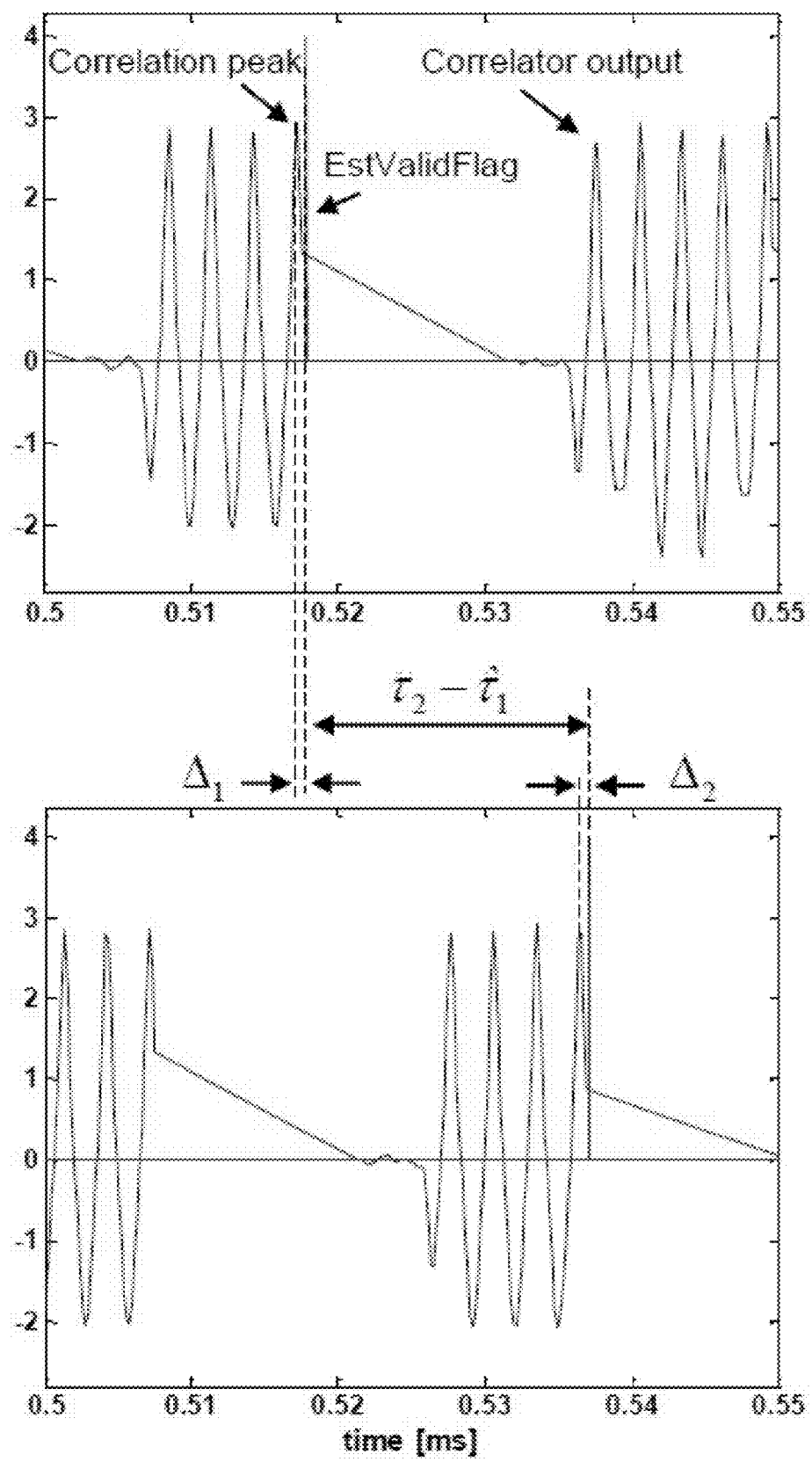
FIG. 17 depicts the skew estimation by peaks of the correlation signal, according to one embodiment.

In prior art methods of skew-error computation, it is suggested that the timing relationship between peaks of corresponding dibits in the bursts of servo signals from the two servo channels be used to obtain an estimate of the skew error. However, the output signal of a matched-filter interpolator/correlator in a synchronous servo channel provides significantly more robust identification of the timing relationships between pulses obtained by reading the servo patterns. Currently, the higher robustness of the recently introduced synchronous servo channel is not exploited in the computation of the skew error, as the flags indicating that a new lateral-position estimate has been computed are used for skew estimation. These flags do not contain precise timing information, as illustrated in FIG. 16. Instead of this prior art method, the peaks of the correlation signal, which provide a much better temporal resolution, are used to derive the necessary timing relationships, as shown in FIG. 17.

After initial convergence, the measure of the shift between the servo patterns on the servo channels is given by Equation 2.

$$\hat{\Theta}=\hat{v}(\hat{\tau}_2-\hat{\tau}_1) \quad \text{Equation 2}$$

where $\hat{v}$ denotes the tape velocity estimate, and $\hat{\tau}_2$ and $\hat{\tau}_1$ denote the time instants at which a flag or signal is generated, such as an estimate valid flag, a flag that is generated upon the detection of the last peak of the correlation signal within to servo burst, or any other flag or signal, on channel 2 and channel 1, respectively. The skew error is then given by Equation 3.

$$\Theta_{ref}=\hat{\Theta}-\Theta_{ref} \quad \text{Equation 3}$$

where for LTO drives, the reference shift $\Theta_{ref} \chi \{\pm 33 \text{ µm}, \pm 66 \text{ µm}\}$ depends on the servo bands spanned by the head module, as discussed earlier.

The timing grid determined by the clock used for clocking the servo channel logic introduces a quantization on $\hat{\tau}_2$ and $\hat{\tau}_1$ that limits the precision of the skew estimate. Non negligible jitter originates from the timing signals that are currently used to compute the skew error. The impact of jitter is substantially reduced by using the peak instants of the correlation signals obtained by a dual synchronous servo channel instead, as illustrated in FIG. 17.

The measure of the shift between the servo patterns on the servo channels is obtained by using the peaks of the correlation signal as shown in Equation 4.

$$\hat{\Theta}=\hat{v}(\hat{\tau}_2-\hat{\tau}_1+\Delta_1-\Delta_2) \quad \text{Equation 4}$$

where the correction terms $\Delta_2$ and $\Delta_1$ denote the time difference between time instants at which the peaks of the correlation signal and the flags occur on channel 2 and channel 1, respectively. As previously stated, any flag or signal may be used in this comparison, such as estimate valid flags, flags that are generated upon the detection of the last peak of the correlation signal within a servo burst, etc. The correction terms $\Delta_2$ and $\Delta_1$ are readily available from the synchronous servo channels, which very accurately determine the arrival times of the correlation signal peaks to compute the lateral-position estimates.

Figure 18:
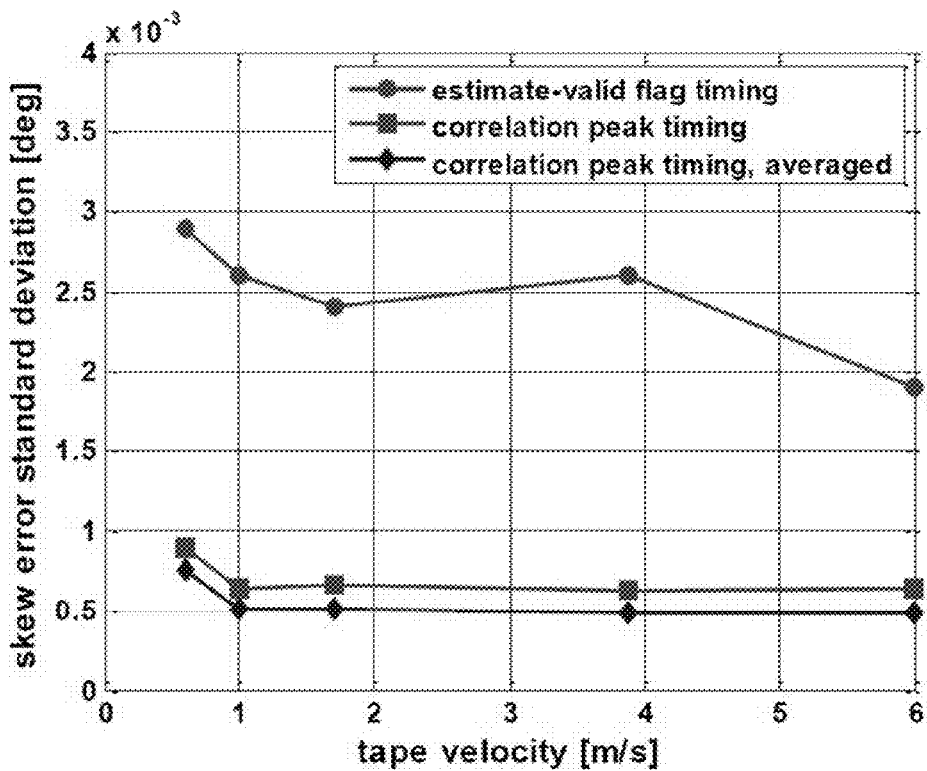
FIG. 18 shows the performance comparison for $\sigma_{skew}=0.5$ microns and $\sigma_{LTM}=0.5$ microns, according to one embodiment.
Figure 19:
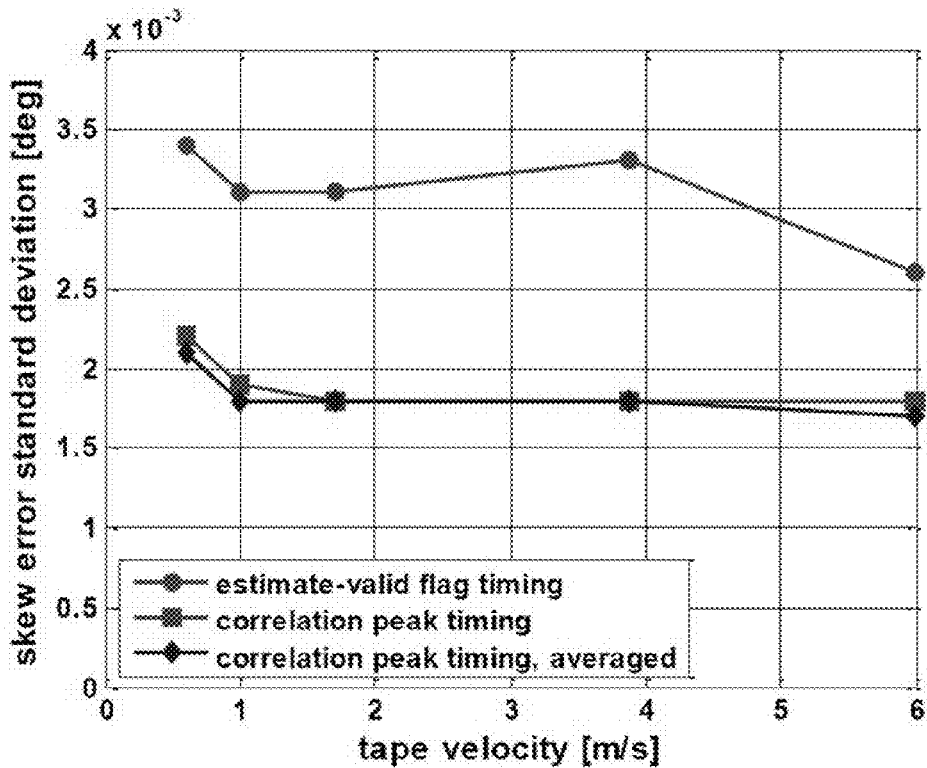
FIG. 19 shows the performance comparison for $\sigma_{skew}=0.6$ and $\sigma_{LTM}=0.8$ microns, according to one embodiment.

As LTO servo signal bursts from a servo frame comprise sequences of [4 4 5 5] dibit pulses, further performance improvement in terms of skew-error signal (SES) standard deviation may be obtained by averaging the time intervals between correlation peaks. Several methods of accomplishing this have been investigated by simulations. A performance comparison is shown in FIGS. 18 and 19, for a channel signal to noise ratio (SNR) of 24.7 dB, and standard deviations of the disturbances affecting skew and lateral tape motion given by $\sigma_{skew}$=0.5 microns and $\sigma_{LTM}$=0.5 microns, and $\sigma_{skew}$=0.6 microns and $\sigma_{LTM}$=0.8 microns, respectively. Experimental results of SES standard deviation obtained in an LTO-5 drive for various tape velocities, using the timing provided by estimate valid flags, are given in Table 2, showing the experimental results of SES standard deviation in an LTO-5 drive.

TABLE 2

| Tape Velocity [m/s] | SES Standard Deviation [deg] |
|---|---|
| 1.71 | 0.003 |
| 2.28 | 0.003 |
| 2.95 | 0.003 |
| 3.88 | 0.004 |
| 4.50 | 0.005 |
| 5.12 | 0.003 |
| 5.99 | 0.005 |

From the experimental results, it has been determined that non-negligible jitter may originate from timing signals that are currently used to compute SES. In addition, by using peak instants of correlation signals to compute SES, the impact of jitter is significantly reduced. Furthermore, reliable servo band identification in flangeless drives, including LTO drives, may be achieved by detecting the maximum value of the difference between the lateral position estimates from the two servo channels over the four possible shifts between servo patterns. Moreover, reliability of the identification scheme possibly depends on the dwell time for the hypothesis testing.

Figure 20:
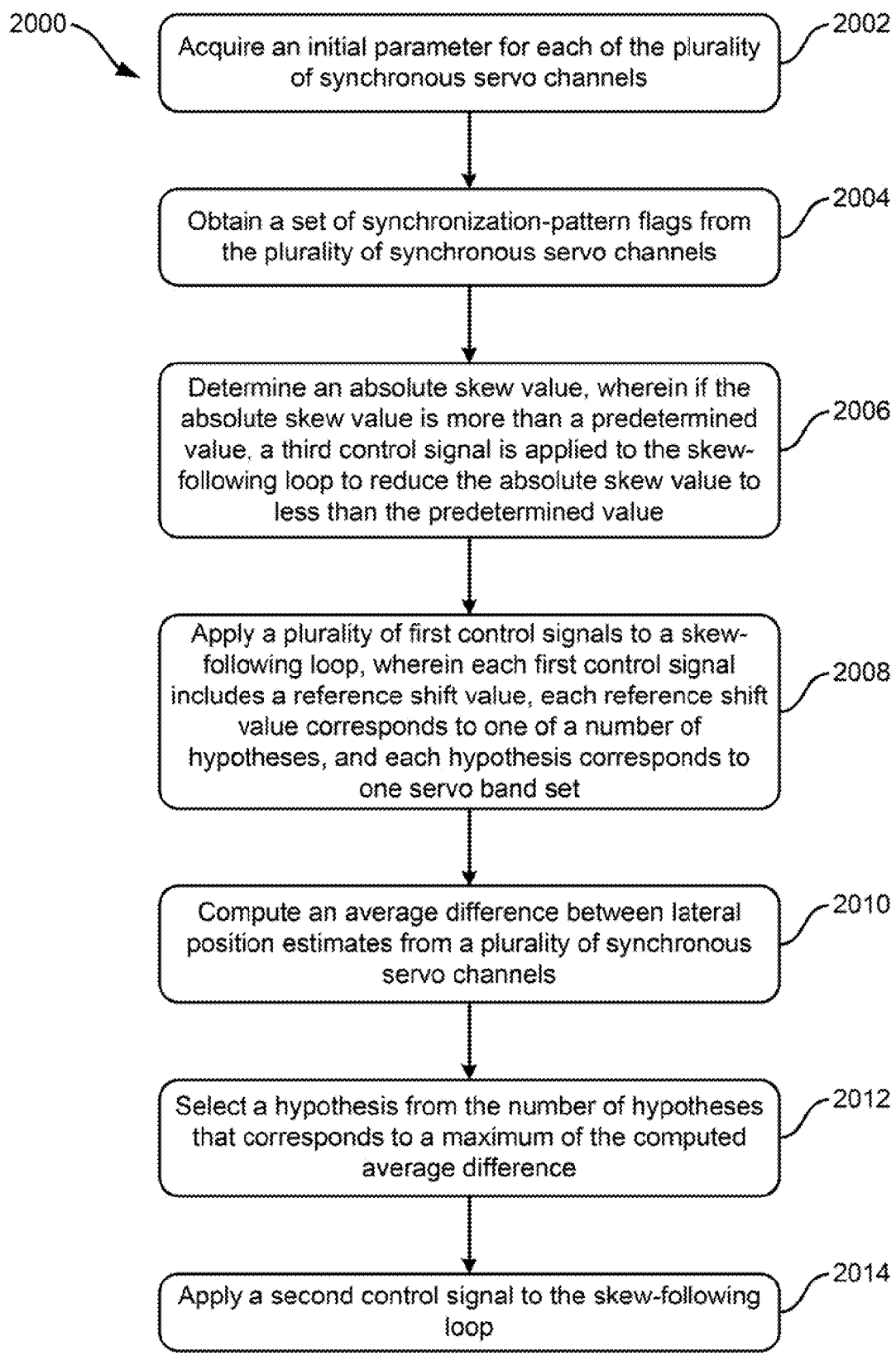
FIG. 20 shows a flow chart of a method according to one embodiment.

Now referring to FIG. 20, according to one embodiment, a method 2000 for identifying which servo bands are being spanned by the head module, and achieving initial convergence of the skew-following loop, may be described. The method 2000 may be executed in any desired environment, and may include more operations than are described herein.

In optional operation 2002, an initial parameter is acquired for each of the plurality of synchronous servo channels. In some other approaches, an initial parameter may be received, generated, requested, etc., in order to acquire the initial parameter.

In one example, two synchronous servo channels are used to obtain a reliable sequence of LPOS symbols and lateral-position estimates from two adjacent servo bands on a tape medium, the two adjacent servo bands spanning a data band.

In optional operation 2004, a set of synchronization-pattern flags from the plurality of synchronous servo channels is obtained. Any method of obtaining the set of synchronization-pattern flags may be used. In some approaches, the set consists of two synchronization-pattern flags obtained from two servo channels. In additional approaches, the set may comprise of three, four, or more synchronization-pattern flags obtained from three, four, or more servo channels spanning one or more data channels.

According to one embodiment, an initial rough estimate of the tape-to-head skew is obtained. The estimate may be obtained by using the LPOS sync-pattern detection flags from two adjacent servo bands associated with the same LPOS word, as the servo patterns on the two adjacent servo bands have the same LPOS symbol sequence encoded therein.

In optional operation 2006, an absolute skew value is determined. If the absolute skew value is more than a predetermined value, a third control signal is applied to the skew-following loop to reduce the absolute skew value to less than the predetermined value.

According to a preferred embodiment, if the absolute value of the estimated tape-to-head skew is larger than a predetermined value (for example, about 100 microns), a control signal is applied to a skew actuator so that the tape-to-head skew is reduced to within the predetermined value. In more approaches, if the absolute value of the estimated tape-to-head skew is larger than about 75 microns, alternatively greater than about 50 microns, alternatively greater than about 120 microns, etc., a control signal is applied to a skew actuator so that the tape-to-head skew is reduced to within the predetermined value.

In operation 2008, a plurality of first control signals are applied to a skew-following loop. Each first control signal includes a reference shift value, each reference shift value corresponds to one of a number of hypotheses, and each hypothesis corresponds to one servo band set. For example, if there are four servo band sets, with each servo band set including two servo bands, then each hypothesis corresponds to one of the servo band pairs (e.g., Hypothesis 0 corresponds to servo bands 0 and 1 (0/1), Hypothesis 1 corresponds to servo bands 1/2, Hypothesis 2 corresponds to servo bands 2/3, Hypothesis 3 corresponds to servo bands 3/4 ). This will enable identification of Which servo bands are being spanned in a later operation.

In one embodiment, the number of hypotheses may total one less than a number of servo bands in a media format readable by a system comprising the plurality of synchronous servo channels. For example, if the number of servo bands equals five, then the number of hypotheses may equal four, one for each pair of servo bands being spanned.

In one embodiment, the absolute value of the estimated tape-to-head skew is smaller than the predetermined value (preferably about 100 microns), a control signal may be applied to the skew actuator so that the four possible shifts corresponding to the range of uncertainty (−66 microns, −33 microns, +33 microns, +66 microns) are swept in sequence. These ranges of uncertainty correspond to a system adhering to the LTO design standards.

In one embodiment, the predetermined value may be less than or equal to about twice a maximum reference shift value. For example, if the maximum reference shift value is −66 microns or +66 microns, then the predetermined value may be less than or equal to about 66 microns*2=132 microns.

According to one approach, during the sweeping of the skew range, for each possible shift, an average difference of the lateral-position estimates is calculated from the two servo channels.

In operation 2010, an average difference between lateral position estimates from a plurality of synchronous servo channels is computed. The average difference may be represented as $\langle\Delta y_n\rangle$, where n represents the hypothesis being tested. Continuing the previous example, $0 \leq n \leq 3$, so four average differences are computed corresponding to each hypothesis (e.g., Hypothesis 0, 1, 2, 3 correspond to average difference $\langle\Delta y_0\rangle$, $\langle\Delta y_1\rangle$, $\langle\Delta y_2\rangle$, $\langle\Delta y_3\rangle$).

In operation 2012, a hypothesis is selected from the number of hypotheses that corresponds to a maximum of the computed average difference. Continuing the previous example, if $\langle\Delta y_2\rangle$ has a value greater than the rest of the average differences, then Hypothesis 2 is selected, which corresponds to <Δy$_2$>. Therefore, it is assumed that servo bands 2/3 are being spanned.

In one embodiment, the servo bands corresponding to the shift that yields a maximum value of the average difference of the lateral-position estimates is identified. If the average differences of the lateral-position estimates are not computed during the sweeping of the skew range, then they are calculated during this operation so that they can be compared to find a maximum value.

In operation 2014, a second control signal is applied to the skew-following loop. The second control signal includes a reference shift value that corresponds to the selected hypothesis. In continuing the previous example, if Hypothesis 2 is selected, which corresponds to <Δy$_2$>, then a reference shift value that corresponds to Hypothesis 2 is selected.

In one embodiment, the skew-following loop is locked onto those servo bands which correspond to the maximum value of the average difference or the lateral-position estimates.

According to some approaches, a system may include logic for executing one or more of the methods disclosed herein. In one embodiment, as system includes a plurality of synchronous servo channels, each synchronous servo channel including a servo reader included in a magnetic head. The system also includes logic for applying a plurality of first control signals to a skew-following loop. Each first control signal includes a reference shift value, each reference shift value corresponds to one of a number of hypotheses, and each hypothesis corresponds to one servo band set. In addition, the system includes logic for computing an average difference between lateral position estimates from the plurality of synchronous servo channels, logic for selecting a hypothesis from the number of hypotheses that corresponds to a maximum of the computed average difference, and logic for applying a second control signal to the skew-following loop. The second control signal includes a reference shift value that corresponds to the selected hypothesis.

In more embodiments, the system further includes logic for acquiring an initial parameter for each of the plurality of synchronous servo channels, logic for obtaining a set of synchronization-pattern flags from the plurality of synchronous servo channels, and logic for determining an absolute skew value. If the absolute skew value is more than a predetermined value, a control signal is applied to the skew-following loop to reduce the absolute skew value to less than the predetermined value. According to some approaches, the predetermined value may be about 100 microns.

In more approaches, the predetermined value may be less than or equal to about twice a maximum reference shift value.

According to more embodiments, the number of hypotheses may total one less than a number of servo bands in a media format readable by the system. Further, according to one embodiment, the number of servo bands may equal five. In additional approaches, the reference shift value may be selected from a group consisting of −66 microns, −33 microns, +33 microns, and +66 microns from a longitudinal position which correspond to spans across the five servo bands (four servo band pairs).

Of course, systems may implement and include additional embodiments and approaches not specifically described herein, but would be apparent to one of skill in the art.

Figure 21:
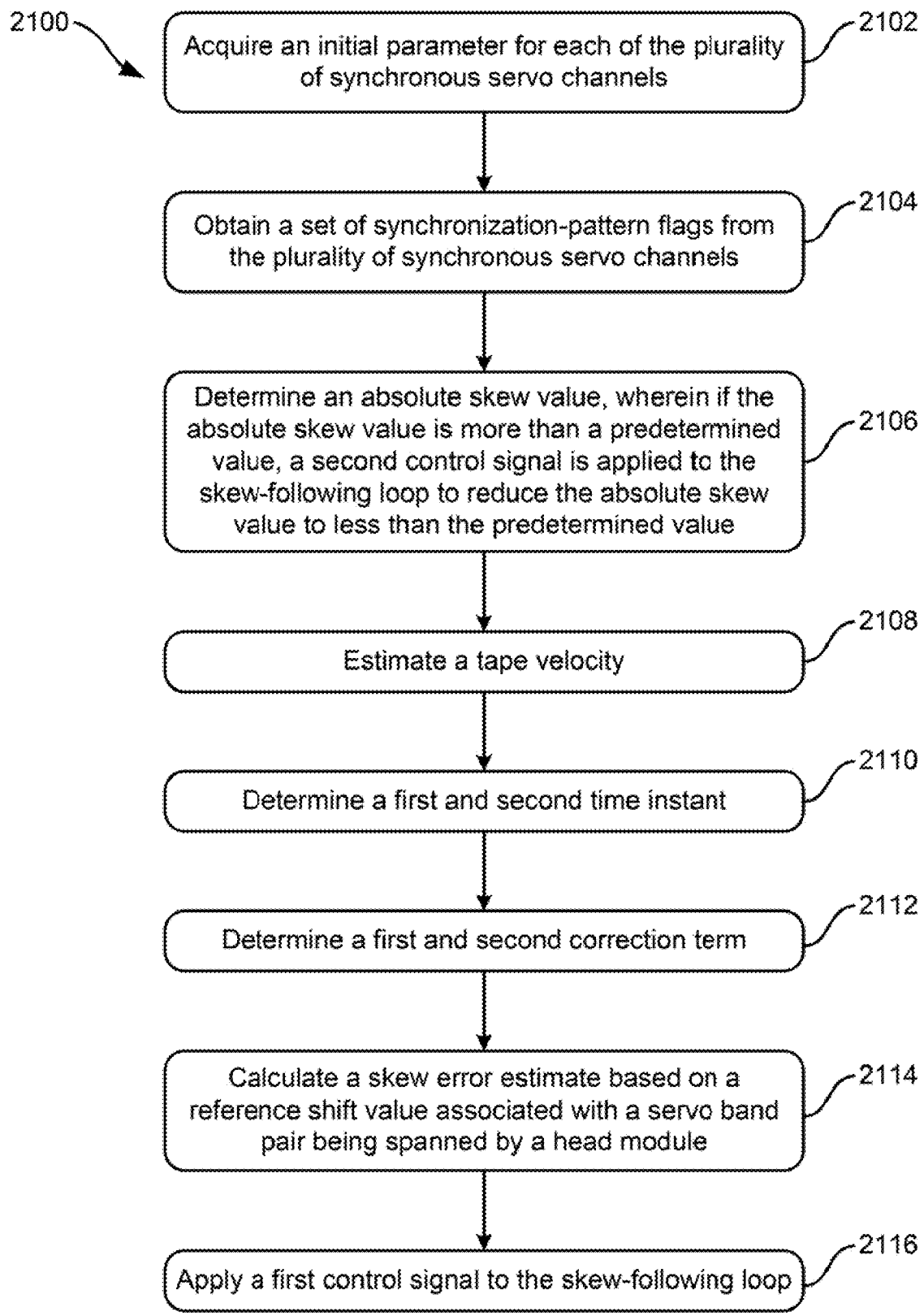
FIG. 21 shows a flow chart of a skew estimation method.

Now referring to FIG. 21, according to one embodiment, a method 2100 for skew compensation is described. The method 2100 may be executed in any desired environment, and may include more operations than those that are described herein.

In optional operation 2102, an initial parameter for each of the plurality of synchronous servo channels is acquired. Any method of acquiring the initial parameter may be used, and the initial parameter may be received, created, requested, etc.

In optional operation 2104, a set of synchronization-pattern flags is obtained from the plurality of synchronous servo channels. Any method may be used to obtain the set of synchronization-pattern flags, such as reading the servo channels.

In optional operation 2106, an absolute skew value is determined. If the absolute skew value is more than a predetermined value, a second control signal is applied to the skew-following loop to reduce the absolute skew value to less than the predetermined value.

In one approach, the predetermined value may be about 100 microns or less. In more approaches, the predetermined value may be less than or equal to about twice a maximum reference shift value.

In operation 2108, a tape velocity ($\hat{v}$) is estimated. Any method may be used to estimate tape velocity, including counting markers on a tape as they pass and are read by a head, a velocity setting on a tape drive moving the tape, etc.

In operation 2110, a first time instant ($\hat{\tau}_1$) and second time instant ($\hat{\tau}_2$) are determined. Each time instant represents a time at which a flag or signal is generated by a related servo channel selected from a plurality of synchronous servo channels.

In operation 2112, a first correction term $\Delta_1$ and a second correction term $\Delta_2$ are determined. Each correction term represents a time difference between a time at which a peak of a correlation signal and a time at which the flag or signal occur on the related servo channel.

In operation 2114, is skew error estimate ($\Theta_{err}$) based on a reference shift value ($\Theta_{ref}$) associated with a servo band pair being spanned by a head module is calculated, where $\Theta_{err} = \hat{v}(\hat{\tau}_2 - \hat{\tau}_1 + \Delta_1 - \Delta_2) - \Theta_{ref}$.

According to one embodiment, the reference shift value may be selected from a group consisting of −66 microns, −33 microns, +33 microns, and +66 microns from a longitudinal position.

In operation 2116, a first control signal is applied to the skew-following loop. The first control signal includes a skew correction that corresponds to the calculated skew error estimate thereby correcting any estimated head-to-tape skew.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system comprising:
   a plurality of synchronous servo channels, each synchronous servo channel receiving a signal from a servo reader of a magnetic head;
   logic for estimating a tape velocity ($\hat{v}$);
   logic for determining a first time instant ($\hat{\tau}_1$) and second time instant ($\hat{\tau}_2$), each time instant representing a time at which a flag is generated by a related servo channel selected from the plurality of synchronous servo channels;
   logic for determining a first correction term $\Delta_1$ and a second correction term $\Delta_2$, each correction term representing a time difference between a time at which a peak of a correlation signal and a time at which the flag occur on the related servo channel;

logic for calculating a skew error estimate ($\Theta_{err}$) based on a reference shift value ($\Theta_{ref}$) associated with a servo band pair being spanned by a head module included in the magnetic head, where $\Theta_{err}=\hat{v}(\hat{\tau}_2-\hat{\tau}_1+\Delta_1-\Delta_2)-\Theta_{ref}$; and logic for applying a first control signal to the skew-following loop, wherein the first control signal includes a skew correction that corresponds to the calculated skew error estimate.

2. The system as recited in claim 1, wherein the reference shift value is selected from a group consisting of −66 microns, −33 microns, +33 microns, and +66 microns from a longitudinal position.

3. The system as recited in claim 1, further comprising:
logic for acquiring an initial parameter for each of the plurality of synchronous servo channels;
logic for obtaining a set of synchronization-pattern flags from the plurality of synchronous servo channels; and
logic for determining an absolute skew value, wherein if the absolute skew value is more than a predetermined value, a second control signal is applied to the skew-following loop to reduce the absolute skew value to less than the predetermined value.

4. The system as recited in claim 3, wherein the predetermined value is less than about 100 microns.

5. The system as recited in claim 3, wherein the predetermined value is less than or equal to about twice a maximum reference shift value.

6. The system as recited in claim 1, wherein the system adheres to linear tape-open design standards.

7. A method comprising:
estimating a tape velocity ($\hat{v}$);
determining a first time instant ($\hat{\tau}_1$) and second time instant ($\hat{\tau}_2$), each time instant representing a time at which a flag is generated by a related servo channel selected from a plurality of synchronous servo channels;
determining a first correction term $\Delta_1$ and a second correction term $\Delta_2$, each correction term representing a time difference between a time at which a peak of a correlation signal and a time at which the flag occur on the related servo channel;
calculating a skew error estimate ($\Theta_{err}$) based on a reference shift value ($\Theta_{ref}$) associated with a servo band pair being spanned by a head module, where $\Theta_{err}=\hat{v}(\hat{\tau}_2-\hat{\tau}_1+\Delta_1-\Delta_2)-\Theta_{ref}$; and
applying a first control signal to the skew-following loop, wherein the first control signal includes a skew correction that corresponds to the calculated skew error estimate.

8. The method as recited in claim 7, wherein the reference shift value is selected from a group consisting of −66 microns, −33 microns, +33 microns, and +66 microns from a longitudinal position.

9. The method as recited in claim 7, further comprising:
acquiring an initial parameter for each of the plurality of synchronous servo channels;
obtaining a set of synchronization-pattern flags from the plurality of synchronous servo channels; and
determining an absolute skew value, wherein if the absolute skew value is more than a predetermined value, a second control signal is applied to the skew-following loop to reduce the absolute skew value to less than the predetermined value.

10. The method as recited in claim 9, wherein the predetermined value is less than about 100 microns.

11. The method as recited in claim 9, wherein the predetermined value is less than or equal to about twice a maximum reference shift value.

12. A system comprising:
a plurality of synchronous servo channels, each synchronous servo channel receiving signals from a servo reader of a magnetic head;
logic for acquiring an initial parameter for each of the plurality of synchronous servo channels;
logic for obtaining a set of synchronization-pattern flags from the plurality of synchronous servo channels;
logic for determining an absolute skew value, wherein if the absolute skew value is more than a predetermined value, a second control signal is applied to the skew-following loop to reduce the absolute skew value to less than the predetermined value;
logic for estimating a tape velocity ($\hat{v}$);
logic for determining a first time instant ($\hat{\tau}_1$) and second time instant ($\hat{\tau}_2$), each time instant representing a time at which a flag is generated by a related servo channel selected from the plurality of synchronous servo channels;
logic for determining a first correction term $\Delta_1$ and a second correction term $\Delta_2$, each correction term representing a time difference between a time at which a peak of a correlation signal and a time at which the flag occur on the related servo channel;
logic for calculating a skew error estimate ($\Theta_{err}$) based on a reference shift value ($\Theta_{ref}$) associated with a servo band pair being spanned by a head module, where $\Theta_{err}=\hat{v}(\hat{\tau}_2-\hat{\tau}_1+\Delta_1-\Delta_2)-\Theta_{ref}$; and
logic for applying a first control signal to the skew-following loop, wherein the first control signal includes a skew correction that corresponds to the calculated skew error estimate.

13. The system as recited in claim 12, wherein the reference shift value is selected from a group consisting of −66 microns, −33 microns, +33 microns, and +66 microns from a longitudinal position.

14. The system as recited in claim 12, wherein the predetermined value is less than about 100 microns.

15. The system as recited in claim 12, wherein the predetermined value less than or equal to about twice a maximum reference shift value.

16. The system as recited in claim 12, wherein the system adheres to linear tape-open design standards.

17. A method comprising:
acquiring an initial parameter for each of the plurality of synchronous servo channels;
obtaining a set of synchronization-pattern flags from the plurality of synchronous servo channels;
determining an absolute skew value, wherein if the absolute skew value is more than a predetermined value, a second control signal is applied to the skew-following loop to reduce the absolute skew value to less than the predetermined value;

estimating a velocity ($\hat{v}$);

determining a first time instant ($\hat{\tau}_1$) and second time instant ($\hat{\tau}_2$), each time instant representing a time at which a flag is generated by a related servo channel selected from the plurality of synchronous servo channels;

determining a first correction term $\Delta_1$ and a second correction term $\Delta_2$, each correction term representing a time difference between a time at which a peak of a correlation signal and a time at which the flag occur on the related servo channel;

calculating a skew error estimate ($\Theta_{err}$) based on a reference shift value ($\Theta_{ref}$) and associated with a servo band pair being spanned by a head module, where $\Theta_{err} = \hat{v}(\hat{\tau}_2 - \hat{\tau}_1 + \Delta_1 - \Delta_2) - \Theta_{ref}$; and applying a first control signal to the skew-following loop, wherein the first control signal includes a skew correction that corresponds to the calculated skew error estimate.

18. The method as recited in claim 17, wherein the reference shift value is selected from a group consisting of −66 microns, −33 microns, +33 microns, and +66 microns from a longitudinal position.

19. The method as recited in claim 17, wherein the predetermined value is less than about 100 microns.

20. The method as recited in claim 17, wherein the predetermined value is less than or equal to about twice a maximum reference shift value.

* * * * *